US012131747B2

(12) United States Patent
Namba et al.

(10) Patent No.: US 12,131,747 B2
(45) Date of Patent: Oct. 29, 2024

(54) VOICE SIGNAL PROCESSING APPARATUS AND NOISE SUPPRESSION METHOD

(71) Applicant: SONY CORPORATION, Tokyo (JP)

(72) Inventors: Ryuichi Namba, Tokyo (JP); Seiji Miyama, Tokyo (JP); Yoshihiro Manabe, Tokyo (JP); Yoshiaki Oikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 696 days.

(21) Appl. No.: 17/283,398

(22) PCT Filed: Aug. 23, 2019

(86) PCT No.: PCT/JP2019/033029
§ 371 (c)(1),
(2) Date: Apr. 7, 2021

(87) PCT Pub. No.: WO2020/079957
PCT Pub. Date: Apr. 23, 2020

(65) Prior Publication Data

US 2021/0343307 A1 Nov. 4, 2021

(30) Foreign Application Priority Data

Oct. 15, 2018 (JP) ................................ 2018-194440

(51) Int. Cl.
*G10L 21/00* (2013.01)
*G10L 21/0216* (2013.01)
*H04R 1/32* (2006.01)

(52) U.S. Cl.
CPC .......... *G10L 21/0216* (2013.01); *H04R 1/326* (2013.01)

(58) Field of Classification Search
CPC ..... G10L 21/0208; G10L 21/02; G10L 21/00; G10L 19/008; G10L 19/012;
(Continued)

(56) References Cited

U.S. PATENT DOCUMENTS 7,085,685 B2 * 8/2006 Poluzzi .................. H04R 3/005 700/50
7,454,332 B2 * 11/2008 Koishida ............. G10L 21/0208 704/226
(Continued)

FOREIGN PATENT DOCUMENTS

CN 1443349 A 9/2003
CN 1589127 A 3/2005
(Continued)

OTHER PUBLICATIONS

J. Nix and V. Hohmann, "Combined Estimation of Spectral Envelopes and Sound Source Direction of Concurrent Voices by Multidimensional Statistical Filtering," in IEEE Transactions on Audio, Speech, and Language Processing, vol. 15, No. 3, pp. 995-1008, Mar. 2007, doi: 10.1109/TASL.2006.889788. (Year: 2007).*
(Continued)

*Primary Examiner* — Edgar X Guerra-Erazo
(74) *Attorney, Agent, or Firm* — CHIP LAW GROUP

(57) ABSTRACT

Noise suppression performance is enhanced by performing appropriate noise suppression suitable for an environment of noise. Noise dictionary data read out from a noise database unit on the basis of installation environment information including information regarding a type of noise, and an orientation between a sound reception point and a noise source is acquired. Then, noise suppression processing is performed on a voice signal obtained by a microphone arranged at the sound reception point, using the acquired noise dictionary data.

20 Claims, 15 Drawing Sheets

(58) Field of Classification Search

CPC .................. G10L 19/265; G10L 19/26; G10L 2021/02085; G10L 2021/02087; G10L 21/0216; G10L 2021/02165; G10L 2021/02166; G10L 2021/02161; G10L 2021/02168; G10L 21/0224; G10L 21/0232; G10L 21/0264; G10L 21/0272; G10L 21/028; G10L 21/0308; G10L 21/0332; G10L 21/0316; G10L 21/034; G10L 21/0364; G10L 2021/03643; G10L 21/0388; G10L 21/038; G10L 21/04; G10L 21/055; G10L 21/049; G10L 21/047; G10L 21/045; G10L 21/043; G10L 21/057; G10L 21/06; G10L 2021/065; G10L 2021/105; G10L 21/10; G10L 21/12; G10L 21/14; G10L 21/16; G10L 25/00; G10L 25/18; G10L 25/15; G10L 25/06; G10L 25/21; G10L 25/24; G10L 25/45; G10L 25/51; G10L 25/57; G10L 25/60; G10L 25/69; G10L 25/72; G10L 25/75; G10L 2025/783; G10L 2025/786; G10L 25/81; G10L 25/84; G10L 25/87; G10L 2025/937; G10L 2025/935; G10L 25/93; H04R 1/326; H04R 1/323; H04R 1/32; H04R 1/22; H04R 1/222; H04R 1/227; H04R 1/24; H04R 1/245; H04R 1/26; H04R 1/265; H04R 5/02; H04R 5/023; H04R 5/027; H04R 5/00; H04R 3/005; H04R 3/04; H04R 3/14; H04R 29/006; H04R 29/005; H04R 29/008; H04R 2203/12; H04R 2205/024; H04R 2205/022; H04R 2410/01; H04R 2410/03; H04R 2410/05; H04R 2400/01; H04R 2430/23; H04R 2430/25; H04R 2430/21; H04R 2440/01; H04R 2460/01

See application file for complete search history.

(56) References Cited

U.S. PATENT DOCUMENTS

| | | | | |
|---|---|---|---|---|
| 9,548,064 | B2 * | 1/2017 | Fujieda | G10L 21/0232 |
| 10,079,026 | B1 | 9/2018 | Ebenezer | |
| 2005/0033786 | A1 * | 2/2005 | Poluzzi | H04R 3/005 708/300 |
| 2006/0104454 | A1 * | 5/2006 | Guitarte Perez | G06F 3/167 704/E21.002 |
| 2009/0048824 | A1 * | 2/2009 | Amada | G10L 21/0208 704/10 |
| 2015/0230023 | A1 * | 8/2015 | Fujieda | G10L 21/0232 381/71.1 |

FOREIGN PATENT DOCUMENTS

| | | | |
|---|---|---|---|
| CN | 101819768 | A | 9/2010 |
| CN | 103219012 | A | 7/2013 |
| JP | 2015-198413 | A | 11/2015 |
| WO | 2011/004503 | A1 | 1/2011 |

OTHER PUBLICATIONS

C. T. Ishi, C. Liu, J. Even and N. Hagita, "Hearing support system using environment sensor network," 2016 IEEE/RSJ International Conference on Intelligent Robots and Systems (IROS), Daejeon, Korea (South), 2016, pp. 1275-1280, doi: 10.1109/IROS.2016.7759211. (Year: 2016).*

S. Hara, S. Kobayashi and M. Abe, "Sound collection systems using a crowdsourcing approach to construct sound map based on subjective evaluation," 2016 IEEE International Conference on Multimedia & Expo Workshops (ICMEW), Seattle, WA, USA, 2016, pp. 1-6, doi: 10.1109/ICMEW.2016.7574694. (Year: 2016).*

Steven F. Boll, "Suppression of acoustic noise in speech using spectral subtraction", IEEE Transactions on Acoustics, Speech, and Signal Processing, vol. ASSP-27, No. 2, Apr. 1979, pp. 113-120.

Ephraim, et al. "Speech Enhancement Using a Minimum Mean Square Error Short-Time Spectral Amplitude Estimator", IEEE Transactions on Acoustics, Speech, and Signal Processing, vol. ASSP-32, No. 6, Dec. 1984, pp. 1109-1121.

International Search Report and Written Opinion of PCT Application No. PCT/JP2019/033029, issued on Oct. 29, 2019, 10 pages of ISRWO.

Fujibayashi, et al., "Study on time adaptive noise estimation using environmental images for speech recognition", IEICE Technical Report, vol. 112, No. 141, pp. 19-22.

* cited by examiner

× NOISE SOURCE POSITION FOR MEASURING DIRECTIONALITY (CENTER OF SPHERE)
● VIEWPOINT (SOUND RECEPTION POINT DESIRED TO REQUIRE DIRECTIONALITY)
○ GRID POINT USED FOR INTERPOLATING CALCULATION OF DIRECTIONALITY

VOICE SIGNAL PROCESSING APPARATUS AND NOISE SUPPRESSION METHOD

CROSS REFERENCE TO RELATED APPLICATIONS

This application is a U.S. National Phase of International Patent Application No. PCT/JP2019/033029 filed on Aug. 23, 2019, which claims priority benefit of Japanese Patent Application No. JP 2018-194440 filed in the Japan Patent Office on Oct. 15, 2018. Each of the above-referenced applications is hereby incorporated herein by reference in its entirety.

TECHNICAL FIELD

The present technology relates to a voice signal processing apparatus and a noise suppression method of the same, and relates particularly to the technical field of noise suppression suitable for environment.

BACKGROUND ART

Examples of noise suppression technologies include a spectrum subtraction technology that subtracts a spectrum of estimated noise from an observation signal, and a technology that performs noise suppression by defining a gain function (spectrum gain, priori/posteriori SNR) defining gains of before and after noise suppression, and multiplying an observation signal by the defined gain function.

Non-Patent Document 1 described below discloses a technology of noise suppression that uses spectrum subtraction. Furthermore, Non-Patent Document 2 described below discloses a technology that uses a method that uses spectrum gain.

CITATION LIST

Non-Patent Document

Non-Patent Document 1: BOLL S. F (1979) Suppression of Acoustic Noise in Speech Using Spectral Subtraction. IEEE Tran. on Acoustics, Speech and Signal Processing ASSP-27, 2, pp. 113-120.

Non-Patent Document 2: Y. Ephraim and D. Malah, "Speech enhancement using minimum mean-square error short-time spectral amplitude estimator", IEEE Trans Acoust., Speech, Signal Processing, ASSP-32, 6, pp. 1109-1121, December 1984.

SUMMARY OF THE INVENTION

Problems to be Solved by the Invention

In the spectrum subtraction method, due to the subtraction, a spectrum enters a perforated state (signals at partial time frequency become 0) in a time frequency slot unit, and this sometimes becomes abrasive sound called musical noise.

Furthermore, in the method of a gain function type, because a specific probability density distribution is assumed for targeted voice (for example, speech, etc.) and noise (mainly steady noise), performance in unsteady noise is bad, or performance declines in an environment in which steady noise deviates from the assumed distribution.

Furthermore, in an actual usage environment, both targeted sound and noise are not dry sources, but do not effectively reflect influence of a spacial transfer characteristic convoluted at the time of propagation, and a radiation characteristic of a noise source, in noise suppression.

In view of the foregoing, the present technology provides a method that can implement appropriate noise suppression suitable for an environment.

Solutions to Problems

A voice signal processing apparatus according to the present technology includes a control calculation unit configured to acquire noise dictionary data read out from a noise database unit on the basis of installation environment information including information regarding a type of noise and an orientation between a sound reception point and a noise source, and a noise suppression unit configured to perform noise suppression processing on a voice signal obtained by a microphone arranged at the sound reception point, using the noise dictionary data.

For example, using a noise database unit storing a property of each type and orientation of a noise source, noise dictionary data of noise suitable for at least a type and orientation of noise in an installation environment of the voice signal processing apparatus is acquired, and this is used for processing of noise suppression (noise reduction).

Normally, the sound reception point corresponds to the position of the microphone.

The orientation between the sound reception point and the noise source may be either information indicating an azimuth angle of a noise point from the sound reception point, or information indicating an azimuth angle of the sound reception point from the noise point.

In the above-described voice signal processing apparatus according to the present technology, it is considered that the control calculation unit acquires a transfer function between a noise source and the sound reception point on the basis of the installation environment information from a transfer function database unit that holds a transfer function between two points under various environments, and the noise suppression unit uses the transfer function for noise suppression processing.

In other words, in addition to noise dictionary data of noise suitable for a type of noise and the azimuth angle, a space transfer function is also used for noise suppression processing.

In the above-described voice signal processing apparatus according to the present technology, it is considered that the installation environment information includes information regarding a distance from the sound reception point to a noise source, and the control calculation unit acquires noise dictionary data from the noise database unit while including the type, the orientation, and the distance as arguments.

In other words, noise dictionary data suitable for at least these type, orientation, and distance is used for noise suppression.

In the above-described voice signal processing apparatus according to the present technology, it is considered that the installation environment information includes information regarding an azimuth angle and an elevation angle between the sound reception point and a noise source as the orientation, and the control calculation unit acquires noise dictionary data from the noise database unit while including the type, the azimuth angle, and the elevation angle as arguments.

Information regarding the orientation is not information regarding a direction when a positional relationship between a sound reception point and a noise source is two-dimensionally seen, but information regarding a three-dimensional direction including a positional relationship in an up-down direction (elevation angle).

In the above-described voice signal processing apparatus according to the present technology, it is considered that an installation environment information holding unit configured to store the installation environment information is included.

Information preliminarily input as installation environment information is stored in accordance with the installation of a voice signal processing apparatus.

In the above-described voice signal processing apparatus according to the present technology, it is considered that the control calculation unit performs processing of storing installation environment information input by a user operation.

For example, in a case where a person who has installed the voice signal processing apparatus, a person who uses the voice signal processing apparatus, or the like inputs installation environment information by an operation, the voice signal processing apparatus can store installation environment information in accordance with the operation.

In the above-described voice signal processing apparatus according to the present technology, it is considered that the control calculation unit performs processing of estimating an orientation or a distance between the sound reception point and a noise source, and performs processing of storing installation environment information suitable for an estimation result.

For example, installation environment information is obtained by performing processing of estimating an orientation or a distance between the sound reception point and a noise source in a state in which the voice signal processing apparatus is installed in a usage environment.

In the above-described voice signal processing apparatus according to the present technology, it is considered that, when estimating an orientation or a distance between the sound reception point and a noise source, the control calculation unit determines whether or not noise of a type of the noise source exists in a predetermined time section.

For each type of the noise source, a time section in which noise is generated is estimated, and the estimation of an orientation or a distance is performed in an appropriate time section.

In the above-described voice signal processing apparatus according to the present technology, it is considered that the control calculation unit performs processing of storing installation environment information determined on the basis of an image captured by an imaging apparatus.

For example, image capturing is performed by an imaging apparatus in a state in which the voice signal processing apparatus is installed in a usage environment, and an installation environment is determined by image analysis.

In the above-described voice signal processing apparatus according to the present technology, it is considered that the control calculation unit performs shape estimation on the basis of a captured image.

For example, image capturing is performed by an imaging apparatus in a state in which the voice signal processing apparatus is installed in a usage environment, and a three-dimensional shape of an installation space is estimated.

In the above-described voice signal processing apparatus according to the present technology, it is considered that the noise suppression unit calculates a gain function using noise dictionary data acquired from the noise database unit, and performs noise suppression processing using the gain function.

A gain function is calculated using noise dictionary data as a template.

In the above-described voice signal processing apparatus according to the present technology, it is considered that the noise suppression unit calculates a gain function on the basis of noise dictionary data that reflects a transfer function that is obtained by convoluting a transfer function between a noise source and the sound reception point, into noise dictionary data acquired from the noise database unit, and performs noise suppression processing using the gain function.

In a case where a transfer function of a noise source and a sound reception point is reflected, the noise dictionary data is deformed.

In the above-described voice signal processing apparatus according to the present technology, it is considered that the noise suppression unit performs gain function interpolation in a frequency direction in accordance with predetermined condition determination in noise suppression processing, and performs noise suppression processing using an interpolated gain function.

For example, in a case where a gain function is obtained for each frequency bin, interpolation in the frequency direction is performed.

In the above-described voice signal processing apparatus according to the present technology, it is considered that the noise suppression unit performs gain function interpolation in a space direction in accordance with predetermined condition determination in noise suppression processing, and performs noise suppression processing using an interpolated gain function.

For example, in a case where a gain function is obtained in a case where there is a plurality of voice recording points due to a plurality of microphones, and the like, interpolation in the space direction is performed.

In the above-described voice signal processing apparatus according to the present technology, it is considered that the noise suppression unit performs noise suppression processing using an estimation result of a time section not including noise and a time section including noise.

For example, a signal-noise ratio (SNR) is obtained in accordance with the estimation of the existence or non-existence of noise as a time section, and the SNR is reflected in gain function calculation.

In the above-described voice signal processing apparatus according to the present technology, it is considered that the control calculation unit acquires noise dictionary data from the noise database unit for each frequency band.

In other words, noise dictionary data is obtained from the noise database unit for each frequency bin.

In the above-described voice signal processing apparatus according to the present technology, it is considered that a storage unit configured to store the transfer function database unit is included.

In other words, the transfer function database unit is stored into the voice signal processing apparatus.

In the above-described voice signal processing apparatus according to the present technology, it is considered that a storage unit configured to store the noise database unit is included.

In other words, the noise database unit is stored into the voice signal processing apparatus.

In the above-described voice signal processing apparatus according to the present technology, it is considered that the control calculation unit acquires noise dictionary data by communication with an external device.

In other words, the noise database unit is not stored into the voice signal processing apparatus.

A noise suppression method according to the present technology includes acquiring noise dictionary data read out from a noise database unit on the basis of installation environment information including information regarding a type of noise and an orientation between a sound reception point and a noise source, and performing noise suppression processing on a voice signal obtained by a microphone arranged at the sound reception point, using the noise dictionary data.

Therefore, noise suppression suitable for an environment is implemented.

MODE FOR CARRYING OUT THE INVENTION

Hereinafter, embodiments will be described in the following order.

<1. Configuration of Voice Signal Processing Apparatus>
<2. Operations of First to Fifth Embodiments>
<3. Noise Database Construction Procedure>
<4. Preliminary Measurement/Input Processing>
<5. Processing Performed When Device Is Used>
<6. Noise Reduction Processing>
<7. Conclusion and Modified Example>

1. Configuration of Voice Signal Processing Apparatus

A voice signal processing apparatus 1 of an embodiment is an apparatus that performs voice signal processing functioning as noise suppression (NR: noise reduction), on a voice signal input by a microphone.

Such a voice signal processing apparatus 1 may have a single configuration, may be connected with another device, or may be built in various electronic devices.

Actually, the voice signal processing apparatus 1 has a configuration of being used with being built in a camera, a television device, an audio device, a recording device, a communication device, a telepresence device, speech recognition device, a dialogue device, an agent device for performing voice support, a robot, or various information processing apparatuses, or with being connected to these devices.

Figure 1:
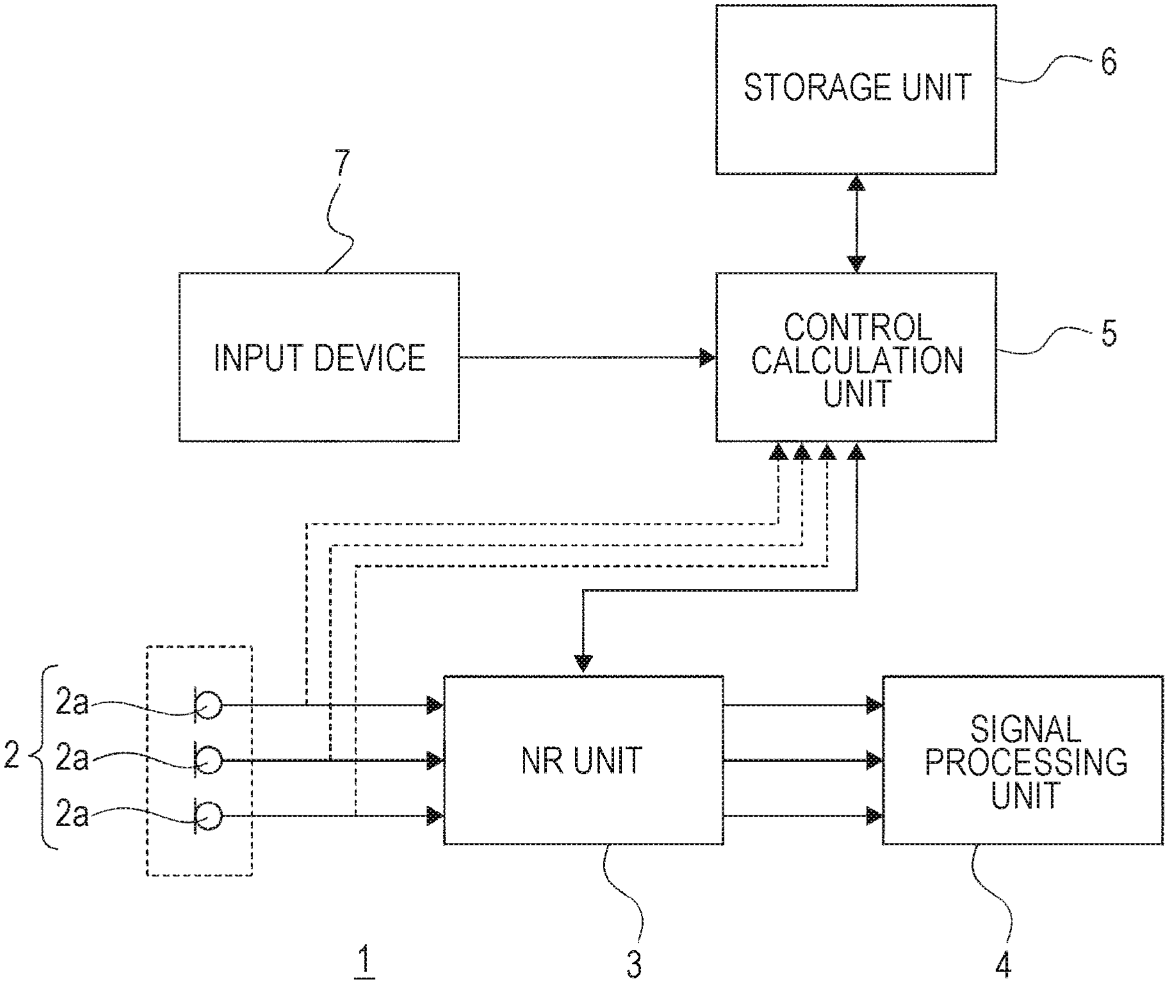
FIG. 1 is a block diagram of a voice signal processing apparatus according to an embodiment of the present technology.

FIG. 1 illustrates a configuration of the voice signal processing apparatus 1. The voice signal processing apparatus 1 includes a microphone 2, a noise reduction (NR) unit 3, a signal processing unit 4, a control calculation unit 5, a storage unit 6, and an input device 7.

Note that not all of these configurations are always required. Furthermore, these configurations need not be integrally provided. For example, a separated microphone 2 may be connected as the microphone 2. The input device 7 is only required to be provided or connected as necessary.

As the voice signal processing apparatus 1 of the embodiment, it is sufficient that at least the NR unit 3 and the control calculation unit 5 functioning as a noise suppression unit are provided.

For example, a plurality of microphones 2*a*, 2*b*, and 2*c* is provided as the microphone 2. Note that, for the sake of convenience of description, the plurality of microphones 2*a*, 2*b*, and 2*c* will be collectively referred to as "the microphone 2" when there is no specific need to indicate the individual microphones 2*a*, 2*b*, and 2*c*.

A voice signal collected by the microphone 2 and converted into an electric signal is supplied to the NR unit 3. Note that, as indicated by broken lines, voice signals from the microphones 2 are sometimes supplied to the control calculation unit 5 so as to be analyzed.

In the NR unit 3, noise reduction processing is performed on an input voice signal. The details of the noise reduction processing will be described later.

A voice signal having subjected to noise reduction processing is supplied to the signal processing unit 4, and necessary signal processing suitable for the function of the device is performed on the voice signal. For example, recording processing, communication processing, reproduction processing, speech recognition processing, speech analysis processing, and the like are performed on the voice signal.

Note that the signal processing unit 4 may function as an output unit of a voice signal having been subjected to noise reduction processing, and transmit the voice signal to an external device.

For example, the control calculation unit 5 is formed by a microcomputer including a central processing unit (CPU), a read only memory (ROM), a random access memory (RAM), an interface unit, and the like. The control calculation unit 5 performs processing of providing data (noise dictionary data) to the NR unit 3 in such a manner that noise suppression suitable for an environment state is performed in the NR unit 3, which will be described in detail later.

The storage unit 6 includes a nonvolatile storage medium, for example, and stores information necessary for control of the NR unit 3 that is performed by the control calculation unit 5. Specifically, information storage serving as a noise database unit, a transfer function database unit, an installation environment information holding unit, and the like, which will be described later, is performed.

The input device 7 indicates a device that inputs information to the control calculation unit 5. For example, a keyboard, a mouse, a touch panel, a pointing device, remote controller, and the like for the user performing information input serve as examples of the input device 7.

Furthermore, a microphone, an imaging apparatus (camera), and various sensors also serve as examples of the input device 7.

Figure 2:
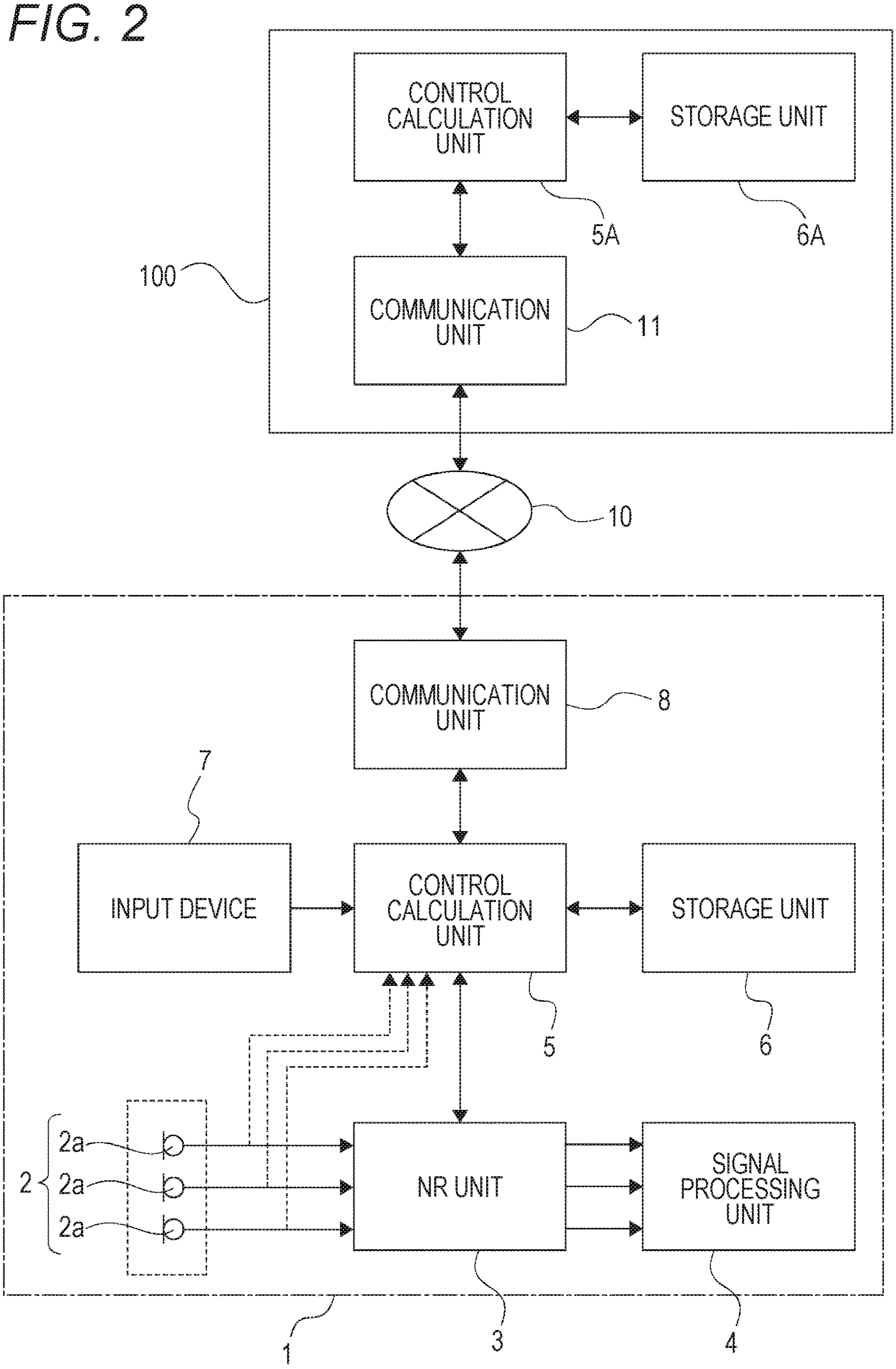
FIG. 2 is a block diagram of the voice signal processing apparatus and an external device according to an embodiment.

FIG. 1 illustrates a configuration in which the storage unit 6 is provided in an integrated device, for example, and the noise database unit, the transfer function database unit, the installation environment information holding unit, and the like are stored. Alternatively, a configuration in which an external storage unit 6A is used as illustrated in FIG. 2 is also assumed.

For example, a communication unit 8 is provided in the voice signal processing apparatus 1, and the control calculation unit 5 can communicate with a computing system 100 serving as a cloud or an external server, via a network 10.

In the computing system 100, a control calculation unit 5A performs communication with the control calculation unit 5 via a communication unit 11.

Then, a noise database unit and a transfer function database unit are provided in the storage unit 6A, and information serving as an installation environment information holding unit is stored in the storage unit 6.

In this case, the control calculation unit 5 acquires necessary information (for example, a noise dictionary data unit obtained from a noise database unit, a transfer function obtained from a transfer function database unit, and the like) in the communication with the control calculation unit 5A.

For example, the control calculation unit 5A transmits installation environment information of the voice signal processing apparatus 1 to the control calculation unit 5A. The control calculation unit 5A acquires noise dictionary data suitable for installation environment information, from the noise database, and transmits the acquired noise dictionary data to the control calculation unit 5, and the like.

As a matter of course, the noise database unit, the transfer function database unit, the installation environment information holding unit, and the like may be provided in the storage unit 6A.

Alternatively, it is considered that only information serving as the noise database unit is stored in the storage unit 6A. In particular, a data amount of the noise database unit is assumed to be enormous. In such case, it is preferable to use an external storage resource of the voice signal processing apparatus 1, such as the storage unit 6A.

The network 10 in the case of the configuration as illustrated in FIG. 2 described above is only required to be a transmission path through which the voice signal processing apparatus 1 can communicate with an external information processing apparatus. For example, various configurations such as the Internet, a local area network (LAN), a virtual private network (VPN), an intranet, an extranet, a satellite communication network, a community antenna television (CATV) communication network, a telephone circuit network, and a mobile object communication network are assumed.

Hereinafter, the description will be continued assuming the configuration illustrated in FIG. 1, but the following description can be applied to the configuration illustrated in FIG. 2.

Figure 3A:
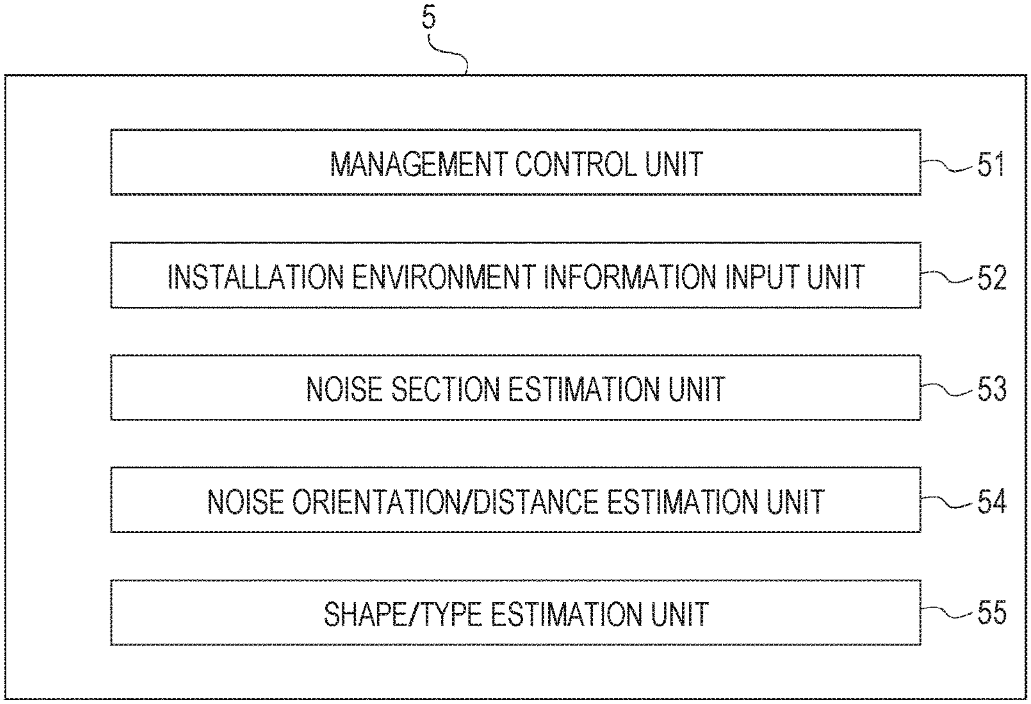
FIGS. 3A and 3B are explanatory diagrams of a function of a control calculation unit and a storage function according to an embodiment.
Figure 3B:
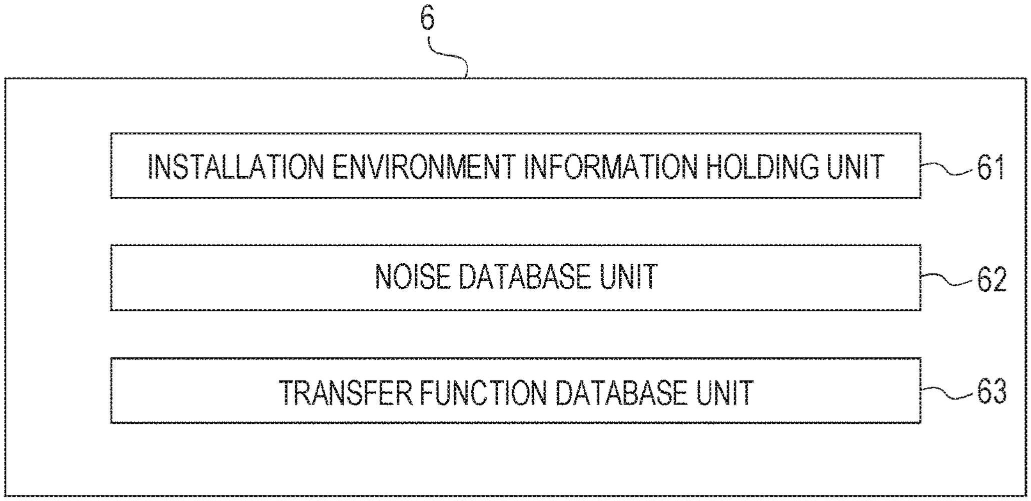

Functions included in the control calculation unit 5, and information regions stored in the storage unit 6 are exemplified in FIGS. 3A and 3B. Note that, in the case of the configuration illustrated in FIG. 2, it is sufficient that the functions illustrated in FIG. 3A are provided with being dispersed into the control calculation units 5 and 5A, and furthermore, the information regions illustrated in FIG. 3B are stored with being dispersed into either or both of the storage units 6 and 6A.

As illustrated in FIG. 3A, the control calculation unit 5 includes functions as a management control unit 51, an installation environment information input unit 52, a noise section estimation unit 53, a noise orientation/distance estimation unit 54, and a shape/type estimation unit 55. Note that the control calculation unit 5 needs not include all of these functions.

The management control unit 51 indicates a function of performing various types of basic processing by the control calculation unit 5. For example, the management control unit 51 indicates a function of performing writing/readout of information into the storage unit 6, communication processing, control processing of the NR unit 3 (supply of noise dictionary data), control of the input device 7, and the like.

The installation environment information input unit 52 indicates a function of inputting specification data such as a dimension and a sound absorption degree of an installation environment of the voice signal processing apparatus 1, and information such as the type, the position, and the orientation of noise existing in the installation environment, and storing the input information as installation environment information.

For example, the installation environment information input unit 52 generates installation environment information on the basis of data input by the user using the input device 7, and causing the generated installation environment information to be stored into the storage unit 6.

Alternatively, the installation environment information input unit 52 generates installation environment information by analyzing an image or voice obtained by an imaging apparatus or a microphone that serves as the input device 7, and causes the generated installation environment information to be stored into the storage unit 6.

The installation environment information includes, for example, the type of noise, a direction (azimuth angle, elevation angle) from a noise source to a sound reception point, a distance, and the like.

The type of noise is, for example, the type of sound itself of noise (type such as a frequency characteristic), the type of the noise source, or the like. The noise source is, for example, a home electric appliance in an installation environment such as, for example, an air conditioner, a washing machine, or a refrigerator, steady ambient noise, or the like.

Furthermore, various methods may be used as a method of breaking noise types down into patterns. For example, in the same category of a refrigerator, washing noise and drying noise are different. Alternatively, noise types are broken down into patterns by sub-category.

The noise section estimation unit 53 indicates a function of determining whether or not each type of noise exists within a predetermined time section, using voice input from a microphone array including one or a plurality of microphones 2 (or another microphone functioning as the input device 7).

Figure 4:
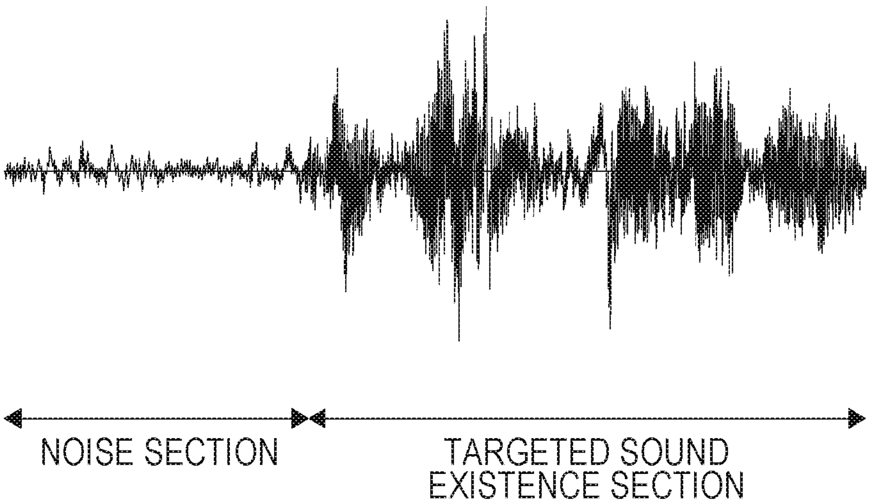
FIG. 4 is an explanatory diagram of noise section estimation according to an embodiment.

For example, the noise section estimation unit 53 determines a noise section serving as a time section in which noise to be suppressed appears, and a targeted sound existence section serving as a time section in which targeted sound such as voice to be recorded exists, as illustrated in FIG. 4.

The noise orientation/distance estimation unit 54 indicates a function of estimating the orientation and distance of each sound source. For example, the noise orientation/distance estimation unit 54 estimates an arrival orientation and a distance of a sound source from a signal observed using voice input from a microphone array including one or a plurality of microphones 2 (or another microphone functioning as the input device 7). For example, a MUltiple SIgnal Classification (MUSIC) method and the like can be used for such estimation.

The shape/type estimation unit 55 indicates a function of inputting, in a case where an imaging apparatus is as the input device 7, image data obtained by performing image capturing by the imaging apparatus, estimating a three-dimensional shape of an installation space by analyzing the image data, and estimating the presence or absence, the type, the position, and the like of a noise source.

As illustrated in FIG. 3B, an installation environment information holding unit 61, a noise database unit 62, and a transfer function database unit 63 are provided in the storage unit 6.

The installation environment information holding unit 61 is a database of holding specification data such as a dimension and a sound absorption degree of an installation environment, and information such as the type, the position, and the orientation of noise existing in the installation environment. That is, installation environment information generated by the installation environment information input unit 52 is stored.

The noise database unit 62 is a database holding a statistical property of noise for each type of noise. In other words, the noise database unit 62 stores a directional characteristic of each sound source type that is preliminarily collected as data, a probability density distribution of amplitude, various orientations, and a spacial transfer characteristic of each distance.

The noise database unit 62 is configured to be able to read out noise dictionary data using the type, the direction, the distance, or the like of the noise source, for example, as an argument.

The noise dictionary data is information including the above-described directional characteristic of each sound source type, the probability density distribution of amplitude, various orientations, and the spacial transfer characteristic of each distance.

Note that the directionality of each sound source can be obtained by preliminarily performing actual measurement using a dedicated device, or performing acoustic simulation, and can be represented by a function that uses an orientation as an argument, for example.

The transfer function database unit 63 is a database holding a transfer function between arbitrary two points in various environments. For example, the transfer function database unit 63 is a database storing a transfer function between two points preliminarily collected as data, or a transfer function generated from shape information by acoustic simulation.

Figure 5:
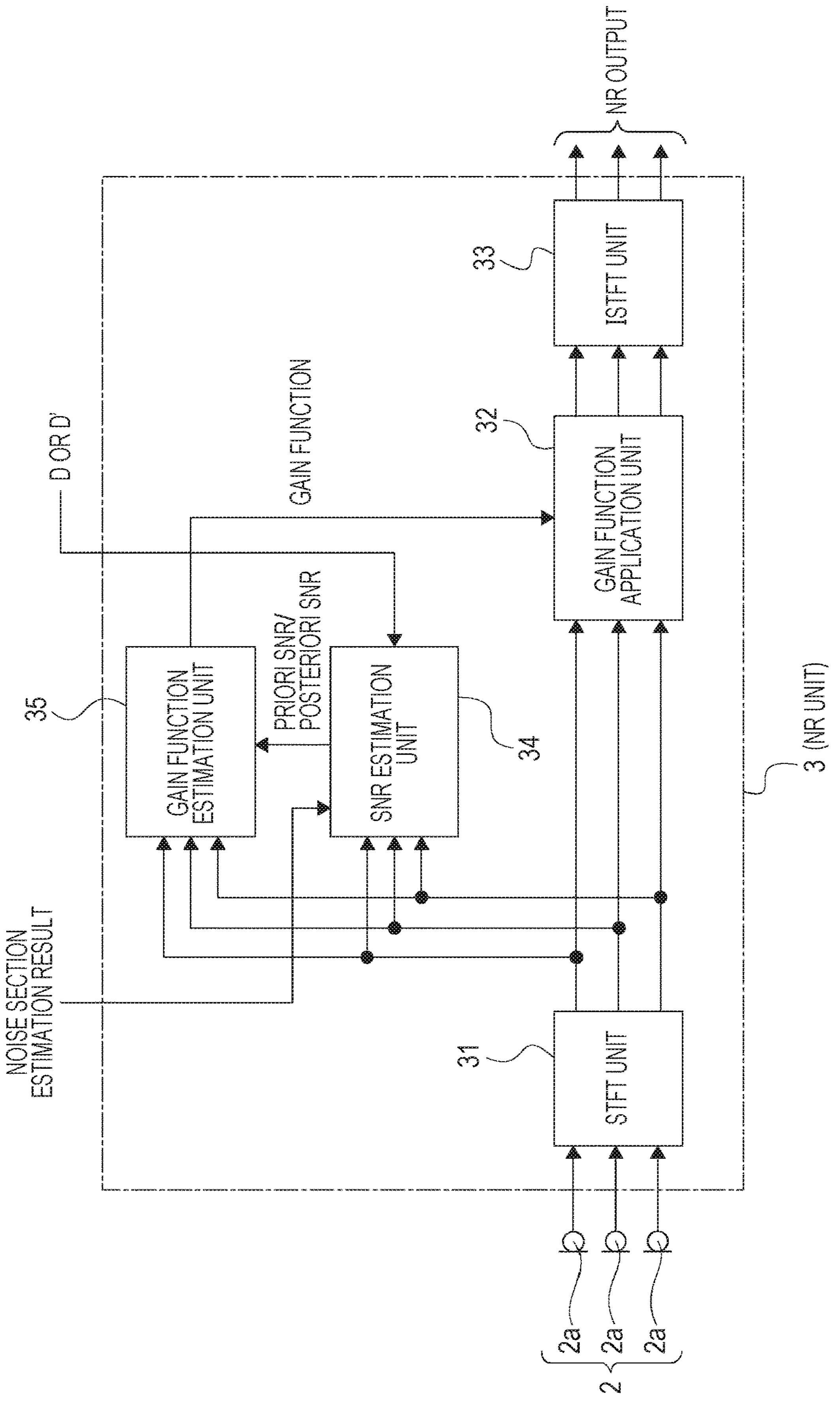
FIG. 5 is a block diagram of an NR unit according to an embodiment.

FIG. 5 illustrates a configuration example of the NR unit 3.

The NR unit 3 performs processing of suppressing corresponding noise on a voice signal input from the microphone 2, utilizing a statistical property obtained from the noise database unit 62.

For example, the NR unit 3 acquires, from the noise database unit 62, information regarding a noise type in a time section determined to include noise, reduces noise from recorded voice, and outputs the voice.

As described above, the accuracy/performance of noise reduction processing is enhanced (for example, convoluted in the order of a statistical property/directional characteristic of a noise source, a transfer characteristic, and microphone (array) directionality) by appropriately deforming (convolution and the like) noise statistical information using noise source statistical information (template such as a gain function or mask information) obtained from the noise database 62, a directional characteristic of a noise source, and a transfer characteristic from a noise source to a sound reception point that is obtained from a positional relationship between two points, using a directional characteristic/transfer characteristic.

In the present embodiment, the accuracy of noise reduction can be made higher by considering noise dictionary data (sound source directionality and the like) preliminarily stored in a database, and signal deformation caused by a transfer characteristic between two points, and the like, using only an observation signal as information, as compared with performing adaptive signal processing/noise reduction processing.

The NR unit 3 includes a short-time Fourier transform (STFT) unit 31, a gain function application unit 32, an inverse short-time Fourier transform (ISTFT) unit 33, an SNR estimation unit 34, and a gain function estimation unit 35.

A voice signal input from the microphone 2 is supplied to the gain function application unit 32, the SNR estimation unit 34, and the gain function estimation unit 35 after having been subjected to short-time Fourier transform in the STFT unit 31.

A noise section estimation result and noise dictionary data D (or noise dictionary data D' considering a transfer function) is input to the SNR estimation unit 34. Then, a priori SNR and a posteriori SNR of a voice signal having been subjected to short-time Fourier transform are obtained using the noise section estimation result and the noise dictionary data D.

Using the priori SNR and the posteriori SNR, a gain function of each frequency bin is obtained in the gain function estimation unit 35, for example. Note that these types of processing performed by the SNR estimation unit 34 and the gain function estimation unit 35 will be described later.

The obtained gain function is supplied to the gain function application unit 32. The gain function application unit 32 performs noise suppression by multiplying a voice signal of each frequency bin by a gain function, for example.

Inverse short-time Fourier transform is performed by the ISTFT unit 33 on the output of the gain function application unit 32, and the obtained output is thereby output as a voice signal on which noise reduction has been performed (NR output).

2. Operations of First to Fifth Embodiments

The voice signal processing apparatus 1 having the above-described configuration performs noise suppression utilizing a radiation characteristic of a noise source and a transfer characteristic in an environment.

For example, noise dictionary data of a statistical property of each type of a noise source (a probability density function that describes an appearance probability of amplitude of a noise source, a time frequency mask, and the like) is created, and the noise dictionary data is acquired using a transfer orientation from the sound source, or the like as an argument.

Furthermore, by utilizing an orientation or a spacial transfer characteristic between a noise source and a sound reception point (the position of the microphone 2 in the embodiment) (in a simplified case, distance), noise suppression is efficiently performed on recorded sound.

Various sound sources have unique radiation characteristics, and voice is not uniformly radiated in all orientations. By considering a radiation characteristic of noise or considering a spacial transfer characteristic indicating a characteristic of reverberation reflection in a space in view of the above-described point, performance of noise suppression is enhanced.

Specifically, by the user inputting the orientation/distance of a noise source, a noise type, a dimension of an installation environment, and the like in the preliminary measurement performed at the time of installation of the voice signal processing apparatus 1, or by performing estimation of noise orientation/distance using a microphone array, an imaging apparatus, and the like when a position changes, in the case of a device having a varying installation location, information regarding the noise type, an azimuth angle, an elevation angle, a distance, and the like is acquired, and the acquired information is recorded as installation environment information.

Next, desired noise dictionary data (template) is extracted from a noise database using the installation environment information as an argument.

Then, noise reduction is performed on an input voice signal from the microphone 2 using the noise dictionary data.

Hereinafter, specific examples of such a system operation are exemplified as operations of first to fifth embodiments.

Note that a system operation includes two types of processing including processing of preliminary measurement (hereinafter, will also be referred to as "preliminary measurement/input processing"), and actual processing performed when the voice signal processing apparatus 1 is used (hereinafter, will also be referred to as "processing performed when a device is used").

In the preliminary measurement/input processing, any of input information of the user, a recorded signal in a microphone array, an image signal obtained by an imaging apparatus, and the like, or a combination of these serves as input information.

Installation environment information such as the dimension of a room in which the voice signal processing apparatus 1 is installed, a sound absorption degree that is based on material, and the position and the type of a noise source is thereby stored into the installation environment information holding unit 61.

In a case where the voice signal processing apparatus 1 is a stationary device, the preliminary measurement is assumed to be performed at the time of installation, the like. Furthermore, in a case where the voice signal processing apparatus 1 is a movable device such as a smart speaker, the preliminary measurement is assumed to be performed at the time of an installation location change.

Next, as processing performed when a device is used, utilizing statistical information of noise extracted from a noise database using a parameter stored in installation environment information, as a parameter, the NR unit 3 performs noise suppression on a voice signal from the microphone 2.

Hereinafter, processing executed by the control calculation unit 5 and the storage unit 6 will be mainly exemplified as an operation performed using the functions illustrated in FIGS. 3A and 3B.

Figure 6:
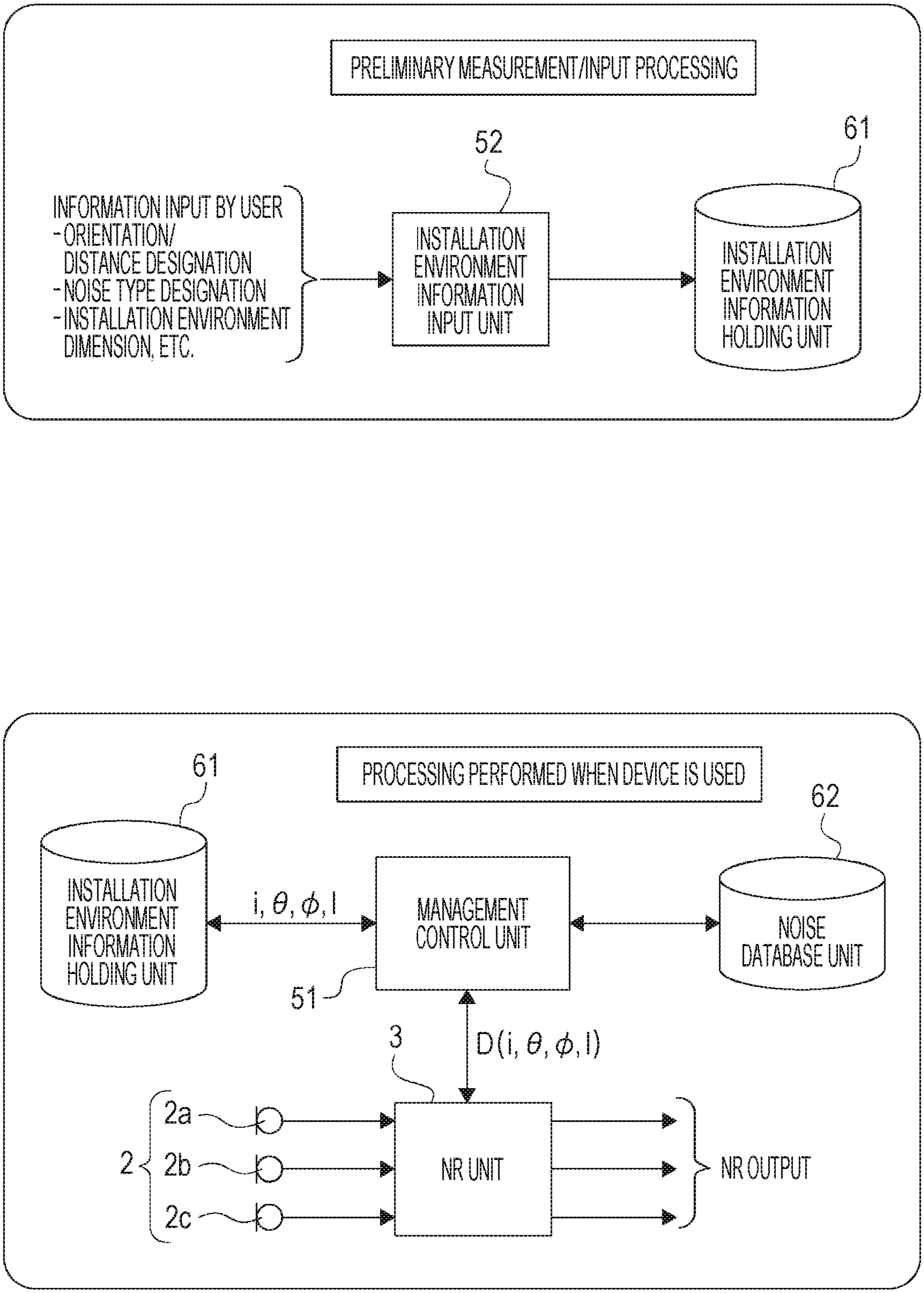
FIG. 6 is an explanatory diagram of a noise suppression operation according to a first embodiment.

FIG. 6 illustrates an operation of the first embodiment.

In the preliminary measurement/input processing, input information input by the user is taken in by the function of the installation environment information input unit 52, and stored into the installation environment information holding unit 61 as installation environment information.

The input information input by the user includes information designating the orientation or distance between a noise source and the microphone 2, information designating a noise type, information regarding an installation environment dimension, and the like.

In the processing performed when a device is used, the management control unit 51 acquires installation environment information (for example, i, θ, φ, l) from the installation environment information holding unit 61, and acquires the noise dictionary data D (i, θ, φ, l) from the noise database unit 62 using the acquired installation environment information as an argument.

Here, i, θ, φ, l are as follows.

i: noise type index

θ: azimuth angle from noise source to sound reception point direction (direction of the microphone 2)

φ: elevation angle from noise source to sound reception point direction l: distance from noise source to sound reception point The management control unit 51 supplies the noise dictionary data D (i, θ, ϕ, l) to the NR unit 3. The NR unit 3 performs noise reduction processing using the noise dictionary data D (i, θ, φ, l).

By this operation, it becomes possible for the NR unit 3 to perform noise reduction processing suitable for an installation environment, such as the type, direction, and distance of noise in particular.

Note that, in the respective examples in FIGS. 6 to 10, i, θ, φ, l are used as examples of installation environment information, but this is an example, and another type of installation environment information such as the dimension of an installation environment and a sound absorption degree can also be used as an argument of the noise dictionary data D. Furthermore, i, θ, φ, l need not be always included, and various combinations of arguments are assumed. For example, only the noise type i and the azimuth angle θ may be used as arguments of the noise dictionary data D.

Figure 7:
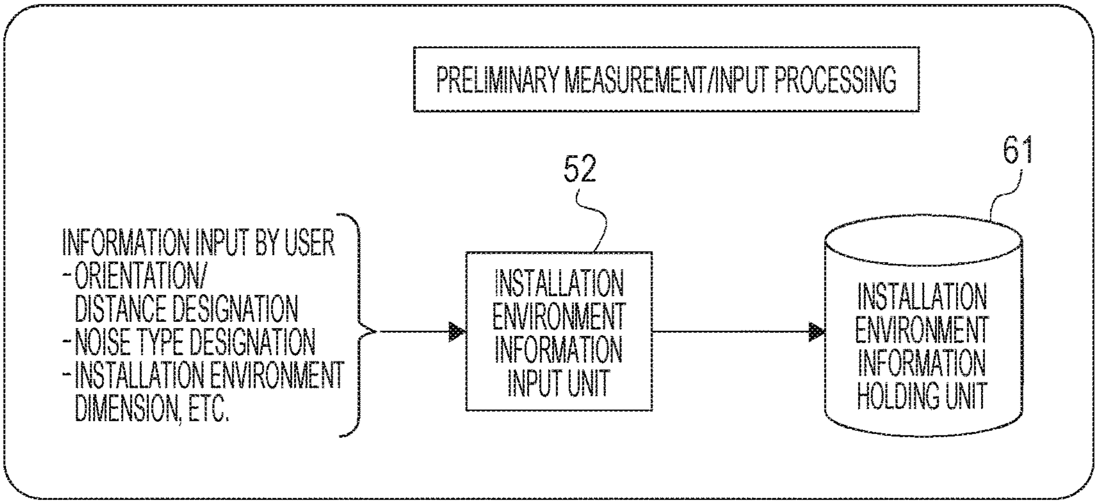
FIG. 7 is an explanatory diagram of a noise suppression operation according to a second embodiment.
Figure 7:
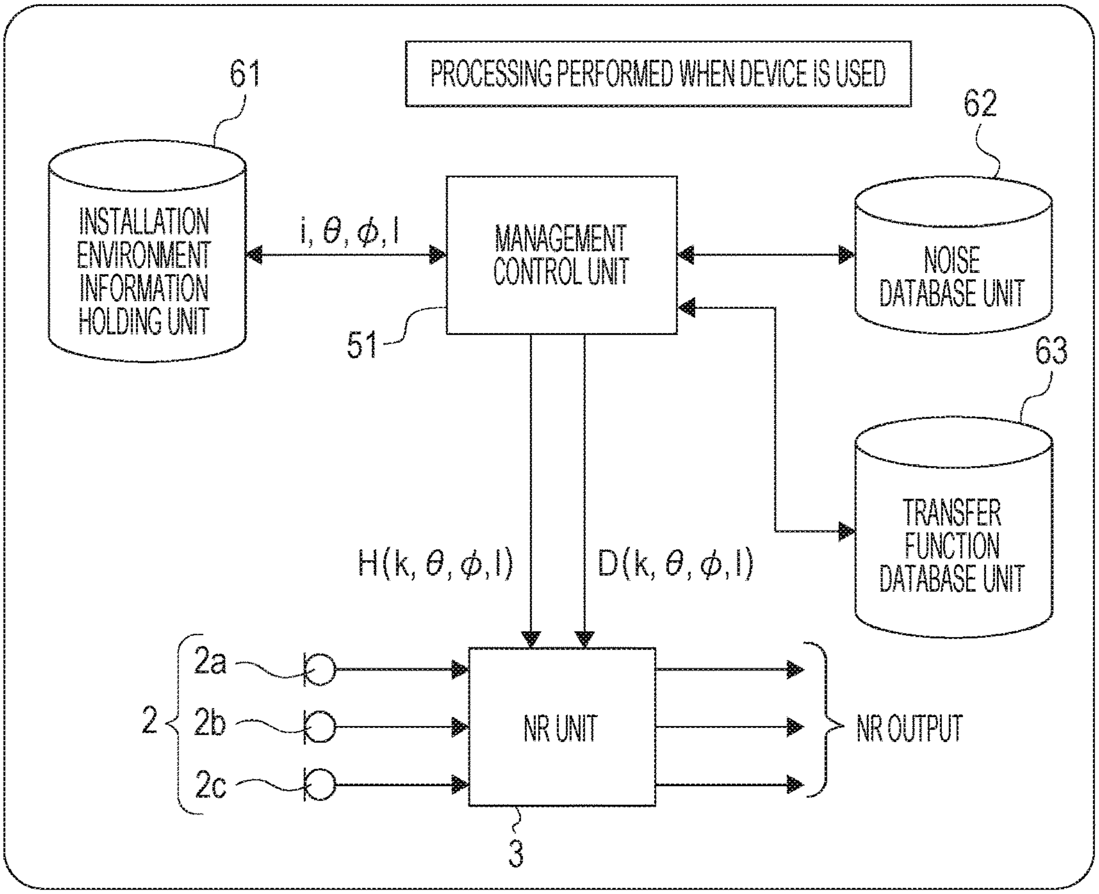

FIG. 7 illustrates an operation of the second embodiment.

The preliminary measurement/input processing is similar to that in FIG. 6.

In the processing performed when a device is used, the management control unit 51 acquires installation environment information (for example, i, θ, φ, l) from the installation environment information holding unit 61, and acquires the noise dictionary data D (i, θ, φ, l) from the noise database unit 62 using the acquired installation environment information as an argument. Furthermore, the management control unit 51 acquires a transfer function H (i, θ, φ, l) from the transfer function database unit 63 using the installation environment information (i, θ, φ, l) as an argument.

The management control unit 51 supplies the noise dictionary data D (i, θ, φ, l) and the transfer function H (i, θ, φ, l) to the NR unit 3.

The NR unit 3 performs noise reduction processing using the noise dictionary data D (i, θ, φ, l) and the transfer function H (i, θ, φ, l).

By this operation, it becomes possible for the NR unit 3 to perform noise reduction processing that is suitable for an installation environment, such as the type, direction, and distance of noise in particular, and reflects the transfer function.

Figure 8:
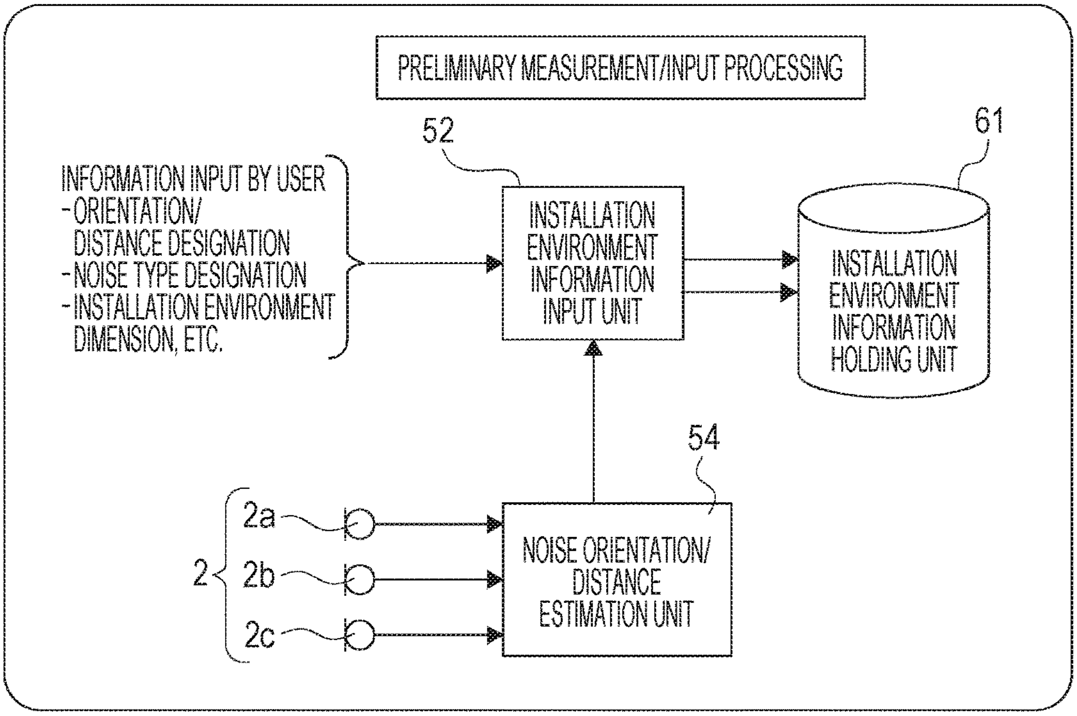
FIG. 8 is an explanatory diagram of a noise suppression operation according to a third embodiment.
Figure 8:
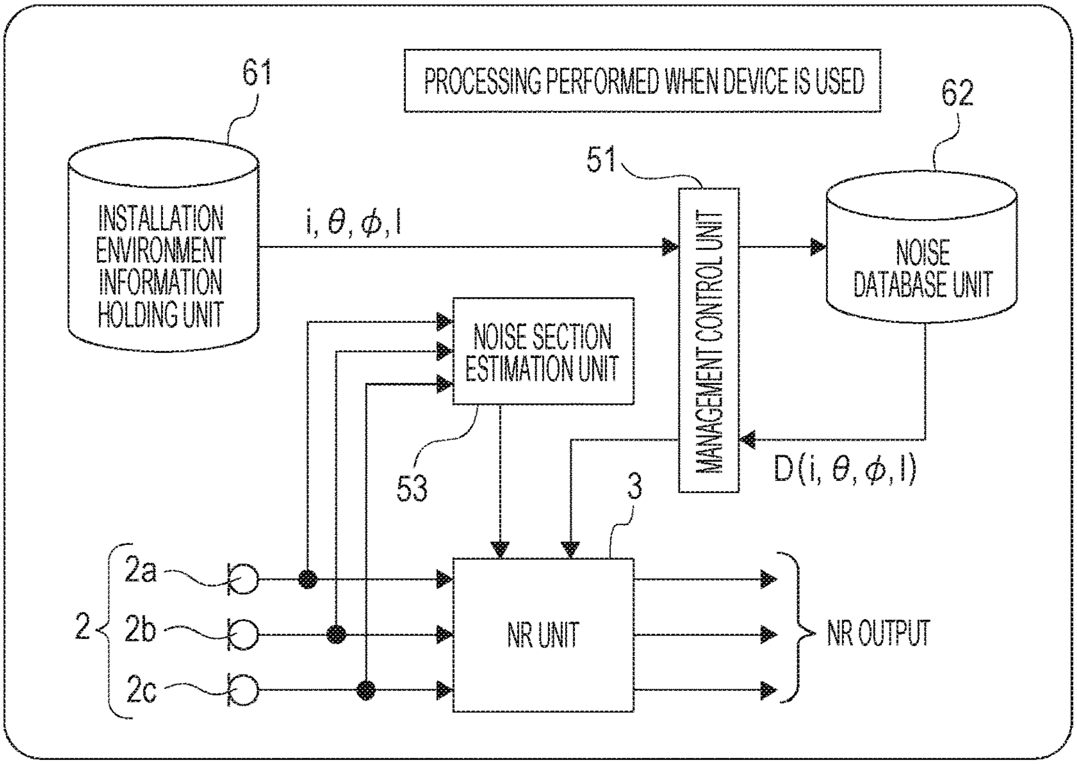

FIG. 8 illustrates an operation of the third embodiment.

In the preliminary measurement/input processing, input information input by the user is taken in by the function of the installation environment information input unit 52, and stored into the installation environment information holding unit 61 as installation environment information.

Furthermore, a voice signal collected by the microphone 2 (or another microphone in the input device 7) is taken in and analyzed by the function of the noise orientation/distance estimation unit 54, and the orientation and the distance of a noise source are estimated. The information can also be stored into the installation environment information holding unit 61 as installation environment information by the function of the installation environment information input unit 52.

Thus, even if input is not performed by the user, installation environment information can be stored. Furthermore, at the time of an arrangement change of the voice signal processing apparatus 1 and the like, even if input is not performed by the user, installation environment information can be updated.

In the processing performed when a device is used, the management control unit 51 acquires installation environment information (for example, i, θ, φ, l) from the installation environment information holding unit 61, and acquires the noise dictionary data D (i, θ, φ, l) from the noise database unit 62 using the acquired installation environment information as an argument. The management control unit 51 supplies the noise dictionary data D (i, θ, φ, l) to the NR unit 3.

Furthermore, determination information of a noise section is supplied to the NR unit 3 by the noise section estimation unit 53.

In the NR unit 3, as for a time section determined to include noise, noise reduction processing is performed using the noise dictionary data D (i, θ, φ, l).

By this operation, it becomes possible for the NR unit 3 to perform noise reduction processing that is suitable for an installation environment, such as the type, direction, and distance of noise in particular, and reflects the transfer function.

Note that, in the NR unit 3, in a time section including noise, noise reduction processing can also be performed using the noise dictionary data D (i, θ, φ, l) and the transfer function H (i, θ, φ, l) as illustrated in FIG. 7.

Figure 9:
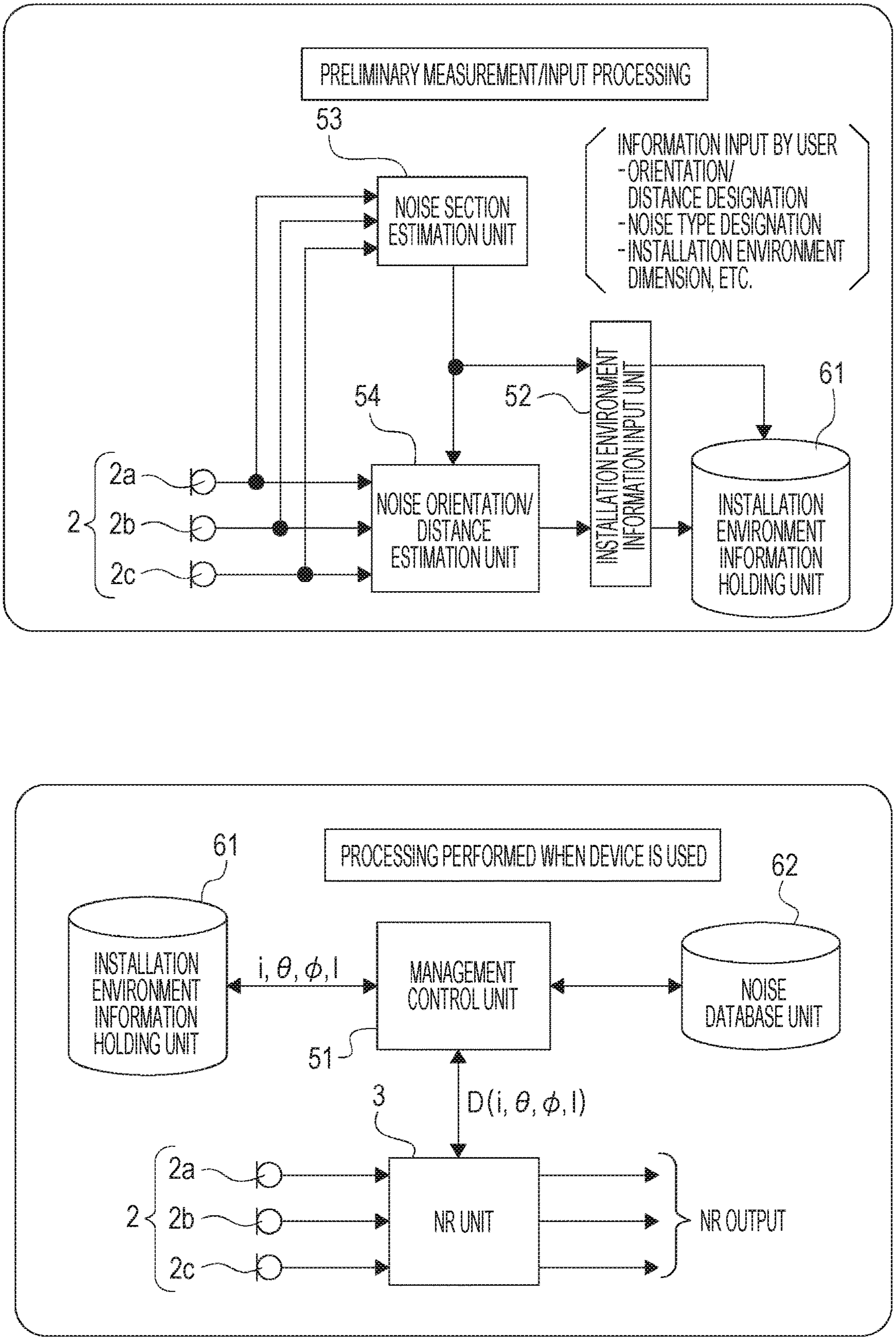
FIG. 9 is an explanatory diagram of a noise suppression operation according to a fourth embodiment.

FIG. 9 illustrates an operation of the fourth embodiment.

In the preliminary measurement/input processing, user input can be omitted. For example, a voice signal collected by the microphone 2 (or another microphone in the input device 7) is taken in and analyzed by the function of the noise orientation/distance estimation unit 54, and the orientation and the distance of a noise source are estimated. The information is stored into the installation environment information holding unit 61 as installation environment information by the function of the installation environment information input unit 52.

Furthermore, in this case, determination of a noise section is performed by the function of the noise section estimation unit 53, and the noise orientation/distance estimation unit 54 estimates orientation, a distance, a noise type, an installation environment, dimension and the like in the time section in which noise is generated.

By using noise section determination information, estimation accuracy of the noise orientation/distance estimation unit 54 can be enhanced.

The processing performed when a device is used is similar to that of the first embodiment illustrated in FIG. 6.

Nevertheless, the transfer function H (i, θ, φ, l) acquired from the transfer function database unit 63 may be used as illustrated in FIG. 7, or it is also assumed that noise section determination information obtained by the noise section estimation unit 53 is used as illustrated in FIG. 8.

Figure 10:
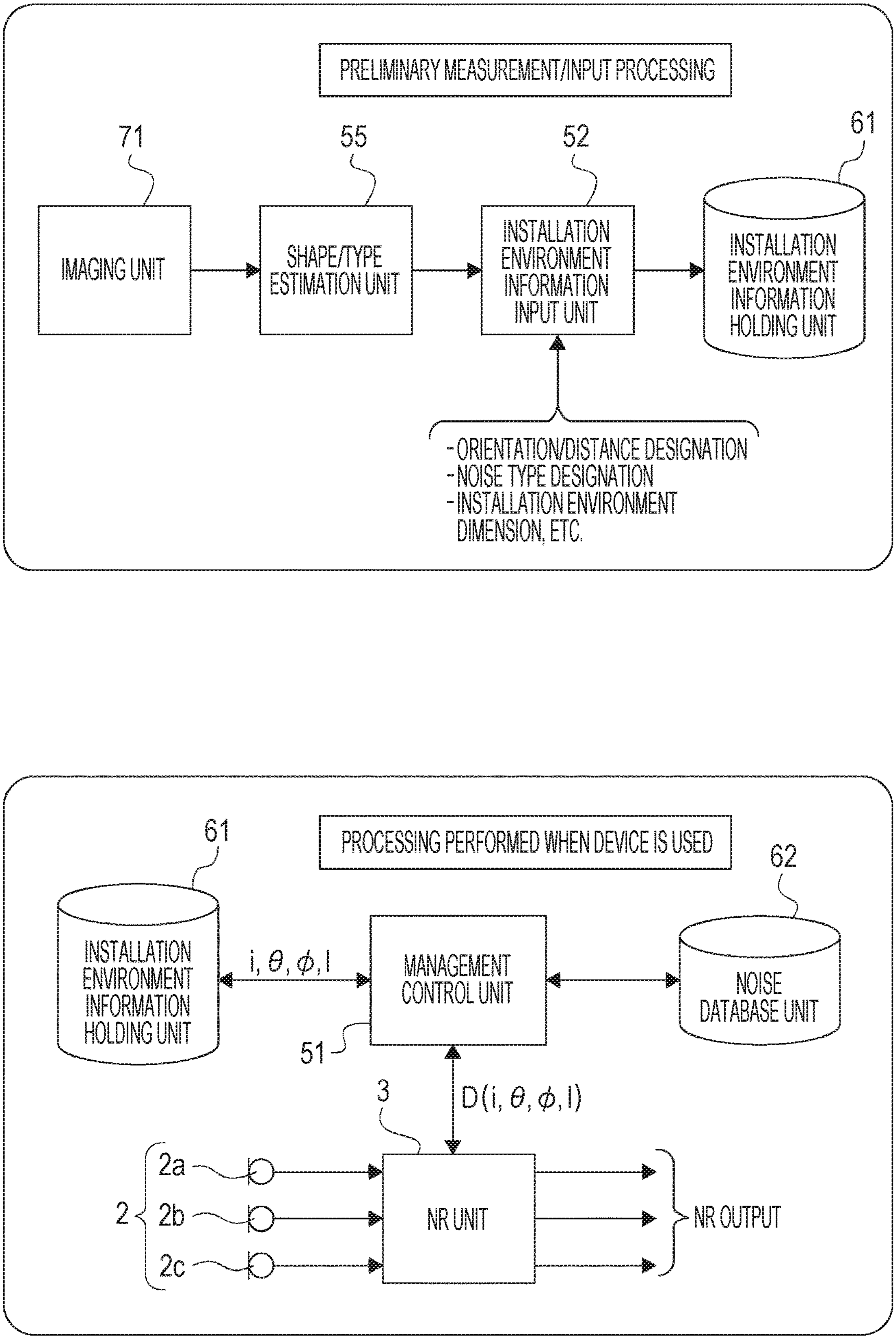
FIG. 10 is an explanatory diagram of a noise suppression operation according to a fifth embodiment.

FIG. 10 illustrates an operation of the fifth embodiment.

Also in this case, in the preliminary measurement/input processing, user input can be omitted. For example, the shape/type estimation unit 55 performs image analysis on an image signal obtained by performing image capturing by an imaging apparatus in the input device 7, and estimates an orientation, a distance, a noise type, an installation environment dimension, and the like.

In particular, in the image analysis, the shape/type estimation unit 55 estimates a three-dimensional shape of an installation space, and estimates the presence or absence and the position of a noise source. For example, a home electric appliance serving as a noise source is determined or a three-dimensional space shape of a room is determined, and then, a distance, an orientation, a reflection status of voice, and the like are recognized.

These pieces of information are stored into the installation environment information holding unit 61 as installation environment information by the function of the installation environment information input unit 52.

By image analysis, environment information input different from speech analysis becomes possible.

Note that, as a combination with the example illustrated in FIG. 8, more accurate or diversified installation environment information can also be obtained by combining speech analysis of the noise orientation/distance estimation unit 54 and image analysis of the shape/type estimation unit 55.

The processing performed when a device is used is similar to that of the first embodiment illustrated in FIG. 6.

Also in this case, the transfer function H (i, θ, φ, l) acquired from the transfer function database unit 63 may be used as illustrated in FIG. 7, or it is also assumed that noise section determination information obtained by the noise section estimation unit 53 is used as illustrated in FIG. 8.

3. Noise Database Construction Procedure

In the above-described various embodiments, the description has been given assuming that the construction of the noise database unit 62 has been preliminarily completed. Here, an example of a construction procedure of the noise database unit 62 will be described.

Figure 11:
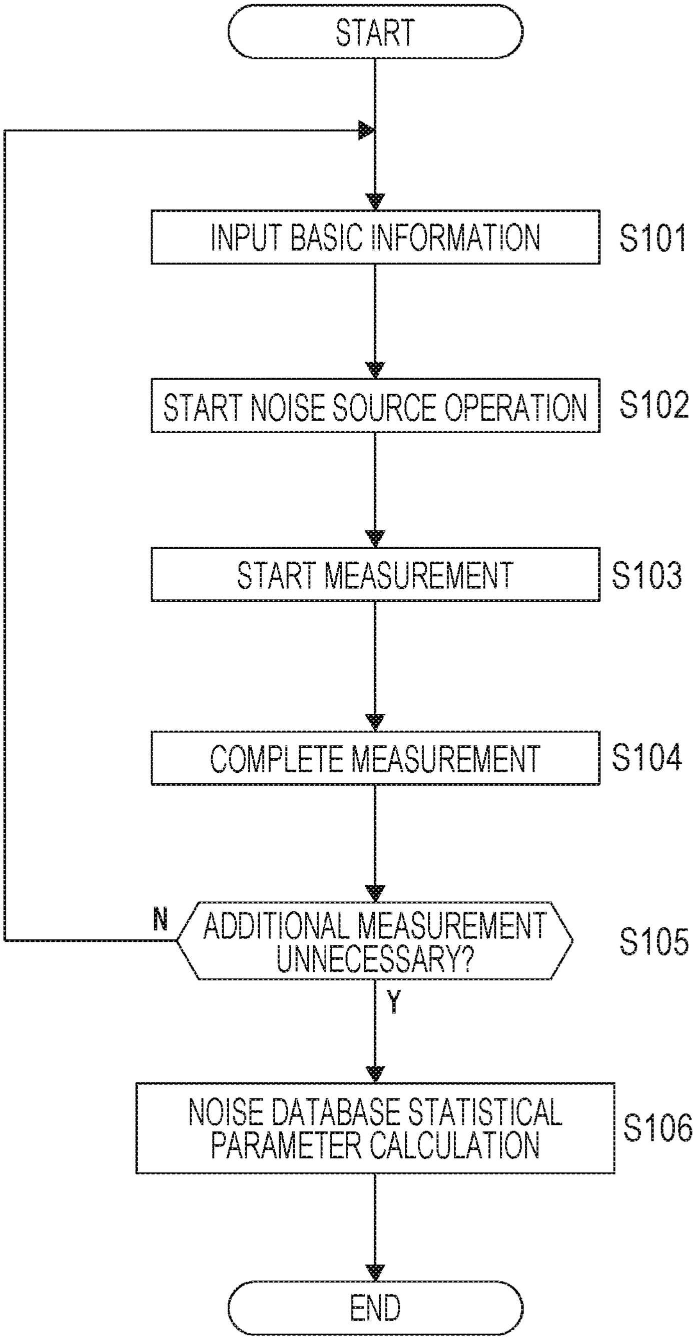
FIG. 11 is a flowchart of processing of noise database construction according to an embodiment.

FIG. 11 illustrates a construction procedure example of the noise database unit 62.

For example, the processing in FIG. 11 is performed using an acoustic recording system and a noise database construction system including an information processing apparatus.

Here, the acoustic recording system refers to an apparatus and an environment in which various noise sources can be installed, and noise can be recorded while changing a recording position of a microphone with respect to a noise source, for example.

In Step S101, basic information input is performed.

For example, information regarding a noise type, and an orientation and a distance of a measurement position from a noise source front surface is input to a noise database construction system by an operator.

In this state, in Step S102, an operation of a noise source is started. In other words, noise is generated.

In Step S103, recording and measurement of noise are started, and the recording and measurement are performed for a predetermined time. Then, in Step S104, measurement is completed.

In Step S105, determination of additional recording is performed.

For example, by performing measurement a plurality of times while changing a noise type or the position of a microphone (that is, orientation or distance), noise recording suitable for diversified installation environments is executed.

That is, the procedure in Steps S101 to S104 is repeatedly performed while changing the position of a microphone or changing a noise source as additional recording.

If necessary measurement ends, the processing proceeds to Step S106, in which statistical parameter calculation is performed by the information processing apparatus of the noise database construction system. In other words, calculation of the noise dictionary data D is performed from measured voice data and the calculated noise dictionary data D is compiled into a database.

As a specific example of measurement/generation of the noise dictionary data D by the above-described procedure, an example of generation/acquisition of noise dictionary data that considers directionality will be described.

For example, a directional characteristic of noise is obtained using a noise type, a frequency, and an orientation as arguments.

First of all, an example of generation of the noise dictionary data D will be described.

For each of a noise type (i), an orientation (θ, φ), and a distance (l), the propagation of sound is calculated by measurement or acoustic simulation such as a finite-difference time-domain method (FDTD method).

Figure 12:
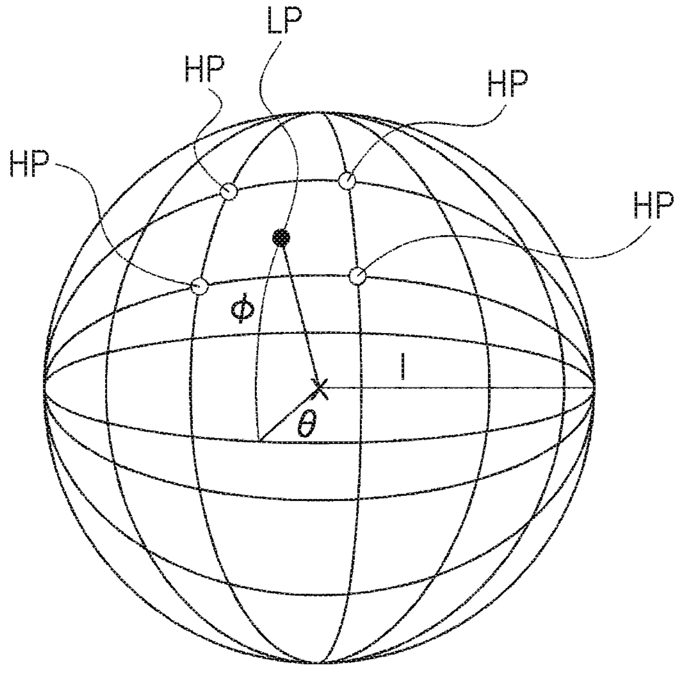
FIG. 12 is an explanatory diagram of acquisition of noise dictionary data according to an embodiment.

FIG. 12 illustrates a sphere, and a noise source is arranged at the center (indicated by "x" in the drawing) of the sphere. Then, by installing microphones at grid points (intersections of circular arcs) of the sphere and performing measurement, or by performing acoustic simulation of a 3D shape of the noise source, a transfer function y from the center noise source position x to each grid point is obtained.

Note that, in the case of measurement as in FIG. 12, the distance (l) is equal to a radius of a microphone array including microphones arranged at intersections of circular arcs (radius of the sphere).

The above-described measurement is repeated and a dictionary of a transfer function with predetermined discretization accuracy is obtained for each of the azimuth angle θ, the elevation angle φ, and the distance l for each noise type i.

Then, discrete Fourier transformation (DFT) of the measured transfer characteristic yi (θ, φ, l) is performed.

$$Y_i(k, \theta, \phi, l) = \sum_{t=0}^{N} y_i(\theta, \phi, t, l)e^{-2\pi jkt/N} \quad \text{[Math. 1]}$$

Note that reference numerals in the formula are as follows.

i: noise type index

θ: azimuth angle from noise source to sound reception point direction

ϕ: elevation angle from noise source to sound reception point direction l: distance from noise source to sound reception point k: frequency bin index N: measured impulse response length Then, an absolute value (amplitude) of an FFT coefficient of each bin is held as the noise dictionary data Di (k, θ, φ, l) suitable for a corresponding environment.

$$D_i(k,\theta,\phi,l)=|Y_i*k,\theta,\phi,l)| \quad \text{[Math. 2]}$$

Note that another gain calculation method may be used as long as the method can perform relative comparison for each type, each orientation, and each distance.

Next, an example of acquisition of the noise dictionary data D will be described.

Basically, it is only required that a value of desired Di (k, θ, φ, l) is acquired from the noise database unit 62 using the noise type (i), the orientation (θ, φ), the distance l, and the frequency k as arguments.

In a case where data of a designated orientation does not exist in the noise database unit 62, it is considered to generate data by performing linear interpolation, Lagrange interpolation (secondary interpolation), and the like from data of surrounding neighboring grid points. For example, in a case where the position of "•," in FIG. 12 is a sound reception point LP for which directionality is desired to be obtained, interpolation is performed using data of grid points HP around the sound reception point LP that are indicated by "○".

In a case where data of a designated distance does not exist in the noise database unit 62, it is considered to generate data on the basis of an inverse distance square law and the like. Furthermore, interpolation may be performed from data of neighboring distance similarly to the case of orientation.

It is assumed that NR is executed for each bin on a frequency axis, using a value of the noise dictionary data D obtained by the above-described method.

Note that, aside from the combination of parameters of i (noise type), θ (azimuth angle), φ (elevation angle), 1 (distance), and k (frequency), for example, a parameter indicating a surrounding environment such as a sound absorption degree, and the like may be used.

Furthermore, in a case where directionality or a frequency characteristic thereof differs substantially, even if noise types are the same, these noise types may be regarded as different types depending on an operation mode and the like. For example, a heating mode or a cooling mode of an air conditioner, and the like.

4. Preliminary Measurement/Input Processing

Subsequently, preliminary measurement/input processing performed at the time of device installation will be described.

For example, when the voice signal processing apparatus 1 (single apparatus or a device including the voice signal processing apparatus 1) is installed for usage, measurement and input of information regarding the installation environment are performed.

Figure 13:
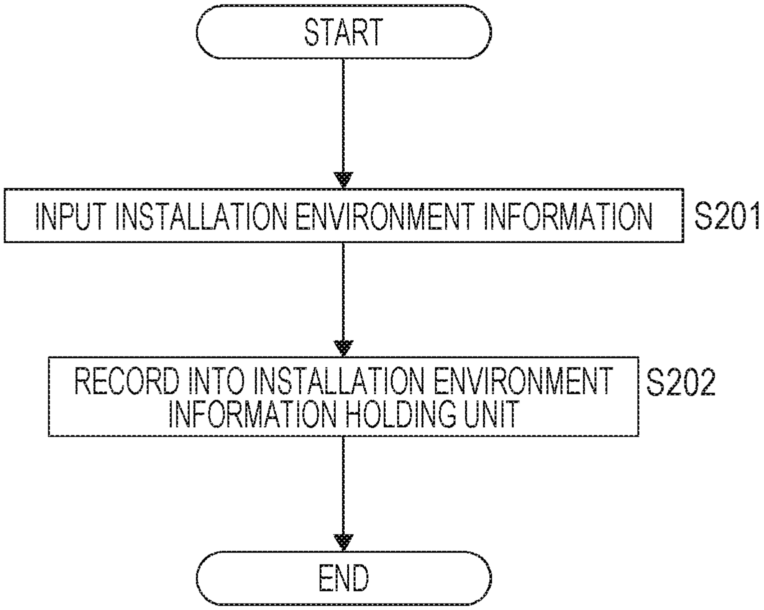
FIG. 13 is a flowchart of preliminary measurement/input processing according to an embodiment.

FIG. 13 illustrates the processing regarding such measurement and input that is performed by the control calculation unit 5 mainly using the function of the installation environment information input unit 52.

In Step S201, the control calculation unit 5 inputs installation environment information from the input device 7 or the like.

As an input mode, input by an operation of the user is assumed. For example, the following inputs and the like are assumed:

Input of information designating the orientation/distance of a noise source with respect to an installed device Input of information designating a noise type Input of an installation environment dimension, material of a wall, a reflectance, a sound absorption degree, and other information regarding a room.

Furthermore, as in the third, fourth, and fifth embodiments described above, input (preliminary measurement) of installation environment information that is other than user input is also performed. For example, a case where the following information is input also assumed;

Measurement value of an orientation or a distance of a noise source that is obtained by the noise orientation/distance estimation unit 54

Estimation information such as noise, an orientation, a distance, or information regarding a room that is obtained by the shape/type estimation unit 55.

If the control calculation unit 5 (the installation environment information input unit 52) acquires these pieces of information obtained by user input or automatic measurement, in Step S202, the control calculation unit 5 performs processing of generating installation environment information on the basis of the acquired information, and storing the generated installation environment information into the installation environment information holding unit 61.

As described above, installation environment information is stored into the voice signal processing apparatus 1.

5. Processing Performed when Device is Used

Subsequently, processing performed when a device is used will be described with reference to FIG. 14.

For example, the processing is processing performed after the power of the voice signal processing apparatus 1 is turned on or an operation of the voice signal processing apparatus 1 is started.

In Step S301, the control calculation unit 5 checks whether or not installation environment information has already been stored. In other words, the control calculation unit 5 checks whether or not storage has been performed into the installation environment information holding unit 61 in the above processing in FIG. 13.

If installation environment information has not been stored yet, in Step S302, the control calculation unit 5 performs acquisition and storage of installation environment information by the above processing in FIG. 13.

In a state in which the installation environment information is stored, the processing proceeds to Step S303.

In Step S303, the control calculation unit 5 acquires installation environment information from the installation environment information holding unit 61, and supplies necessary information to the NR unit 3. Specifically, the control calculation unit 5 acquires the noise dictionary data D from the noise database unit 62 using the installation environment information, and supplies the noise dictionary data D to the NR unit 3.

Furthermore, in some cases, the control calculation unit 5 acquires a transfer function H between a noise source and a sound reception point from the transfer function database 63 using installation environment information, and supplies the transfer function H to the NR unit 3.

If such information is supplied to the NR unit 3 in Step S304, the NR unit 3 calculates a gain function using the noise dictionary data D or further using the transfer characteristic H, and performs noise reduction processing.

After that, the noise reduction processing in Step S304 is continued by the NR unit 3 until an operation end is determined in Step S305.

6. Noise Reduction Processing

An example of noise reduction processing in the NR unit 3 will be described.

Figure 15:
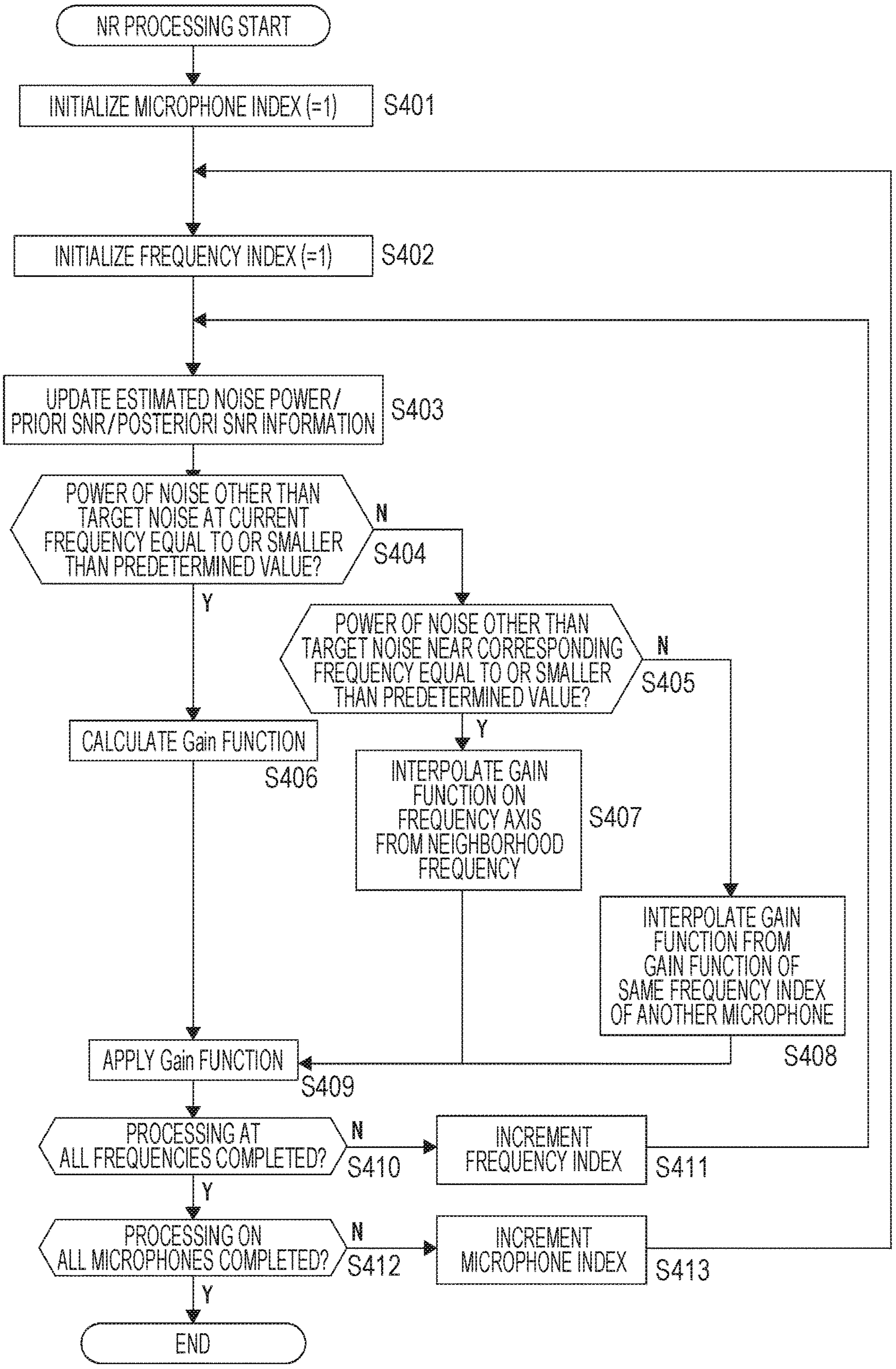
FIG. 15 is a flowchart of processing performed by an NR unit according to an embodiment.

In the NR unit 3, by repeatedly executing the processing in FIG. 15, a gain function for noise reduction processing to be performed on a voice signal obtained by the microphone 2 is calculated, and noise reduction processing is executed. The processing to be described below is gain function setting processing executed by the SNR estimation unit 34 and the gain function estimation unit 35 in FIG. 5.

In Step S401 of FIG. 15, the NR unit 3 performs initialization of a microphone index (microphone index=1).

The microphone index is a number allocated to each of the plurality of microphones 2*a*, 2*b*, 2*c*, and so on. By performing initialization of a microphone index, a microphone with an index number=1 (for example, the microphone 2*a*) can be initially used as a processing target of gain function calculation.

In Step S402, the NR unit 3 performs initialization of a frequency index (frequency index=1).

The frequency index is a number allocated to each frequency bin, and by performing initialization of a frequency index, a frequency bin with an index number 1 can be initially used as a processing target of gain function calculation.

In Steps S403 to S409, for the microphone 2 with a designated microphone index, a gain function of a frequency bin designated by a frequency index is obtained and applied.

First of all, an overview of a flow in Steps S403 to S409 will be described, and the details of gain function calculation will be described later.

First of all, in Step S403, the NR unit 3 updates estimated noise power, a priori SNR, and a posteriori SNR for a corresponding microphone 2 and frequency bin, by the SNR estimation unit 34 in FIG. 5.

The priori SNR is an SNR of targeted sound (for example, mainly human voice) with respect to suppression target noise.

The posteriori SNR is an SNR of actual observation sound after noise superimposition, with respect to suppression target noise.

For example, FIG. 5 illustrates an example in which a noise section estimation result is input to the SNR estimation unit 34. In the SNR estimation unit 34, using the noise section estimation result, noise power and a posteriori SNR are updated in a time section in which suppression target noise exists. Although a power true value of targeted sound cannot be obtained, the priori SNR can be calculated using an existing method such as a decision-directed method disclosed in Non-Patent Document 2.

In Step S404, the NR unit 3 determines whether or not power of noise other than target noise at current frequency is equal to or smaller than a predetermined value. The determination is performed for determining whether or not gain function calculation can be executed with high reliability.

When a positive result is obtained in Step S404, in Step S406, the NR unit 3 performs gain function calculation using the gain function estimation unit 35.

Then, in Step S409, the obtained gain function is transmitted to the gain function application unit 32 as a gain function of a frequency bin of the target microphone 2, and applied to noise reduction processing.

Note that, when microphone index=1 and frequency index=1 are set, the processing always proceeds to Step S406 from Step S404. This is because interpolation in Steps S407 or S408, which will be described later, cannot be performed.

When a positive result is not obtained in Step S404, in Step S405, the NR unit 3 determines whether or not power of noise other than the target noise near the corresponding frequency is equal to or smaller than a predetermined value. The determination is determination as to whether or not gain function interpolation on a frequency axis is suitable.

When a positive result is obtained in Step S405, in Step S407, the NR unit 3 performs interpolation calculation of a gain function. In other words, using the gain function estimation unit 35, the NR unit 3 performs processing of interpolating a gain function of the corresponding frequency bin on a frequency axis from a neighborhood frequency using directionality dictionary information that is based on the noise dictionary data D.

Then, in Step S409, the obtained gain function is transmitted to the gain function application unit 32 as a gain function of a frequency bin of the target microphone 2, and applied to noise reduction processing.

When a positive result is not obtained in Step S405, in Step S408, the NR unit 3 performs interpolation calculation of a gain function. In this case, using the gain function estimation unit 35, the NR unit 3 performs processing of interpolating a gain function of a frequency bin of the target microphone 2 using a gain function of the same frequency index of another microphone 2, using directionality dictionary information that is based on the noise dictionary data D.

Then, in Step S409, the obtained gain function is transmitted to the gain function application unit 32 as a gain function of a frequency bin of the target microphone 2, and applied to noise reduction processing.

Then, in Step S410, the NR unit 3 checks whether or not the above-described processing in Steps S403 to S409 has been performed in the entire frequency band, and if the processing has not been completed, a frequency index is incremented and the processing returns to Step S403. That is, the NR unit 3 performs processing of similarly obtaining a gain function for the next frequency bin.

In a case where the processing in Steps S403 to S409 has been completed in the entire frequency band for a certain one microphone 2, in Step S412, the NR unit 3 checks whether or not the processing has been completed for all the microphones 2. If the processing has not been completed, in Step S413, the NR unit 3 increments a microphone index and the processing returns to Step S402. That is, for the other microphones 2, processing is sequentially started for each frequency bin.

In this manner, in FIG. 15, for each of the microphones 2, a gain function is obtained for each frequency bin, and the obtained gain function is applied to noise reduction processing.

In this case, in the processing in Steps S403, S404, and S405, a calculation method of a gain function is selected.

In a case where the processing proceeds to Step S406, gain function calculation is performed.

In a case where the processing proceeds to Step S407, a gain function is obtained by interpolation in a frequency direction.

In a case where the processing proceeds to Step S408, a gain function is obtained by interpolation in a space direction.

Hereinafter, the processing of the gain functions will be described.

The above-described processing in FIG. 15 is an example of noise reduction that uses the noise dictionary data D. In other words, a gain function G(k) is calculated for each frequency k using dictionary Di (k, θ, φ, l) as a template (i: noise type, k: frequency, θ: azimuth angle, φ: elevation angle, l: distance). Then, by calculating estimated noise power using the dictionary, the accuracy of a gain function is enhanced.

Nevertheless, in Step S406, the noise dictionary data D is not used, and in the processing in Steps S407 and S408, the noise dictionary data D is used.

Then, if a gain function is obtained, the gain function is applied for each frequency and a noise reduction output is obtained. In a case where a noise reduction method of applying a spectrum gain function is used, X(k)=G(k)Y(k) is obtained. X(k) denotes a voice signal output having been subjected to noise reduction processing, G(k) denotes gain function, and Y(k) denotes a voice signal input obtained by the microphone 2.

First of all, gain function calculation in Step S407 will be described.

The gain function calculation is performed assuming a specific distribution shape as a probability density distribution of amplitude (/phase) of targeted sound (while changing in accordance with the type of targeted sound or the like).

The update of estimated noise power, the priori SNR, and the posteriori SNR in Step S403 is used for gain function calculation.

In the case of the present embodiment, as illustrated in FIG. 5, by the SNR estimation unit 34 acquiring information regarding a noise section estimation result, a time section in which targeted sound does not exist can be determined.

Thus, noise power $\sigma_N^2$ is estimated using a time section in which targeted sound does not exist.

The priori SNR is an SNR of targeted sound with respect to suppression target noise, and is represented as follows.

$$\xi(\lambda, k) = \frac{\sigma_S^2(\lambda, k)}{\sigma_N^2(\lambda, k)} \qquad \text{[Math. 3]}$$

Here, reference numerals in the formula are as follows.

ξ(λ, k): priori SNR

λ: time frame index k: frequency index $\sigma_s^2$: targeted sound power $\sigma_N^2$: noise power In this manner, the priori SNR can be obtained by estimating the noise power $\sigma_N^2$ from a section only including noise in which targeted sound does not exist, and calculating targeted sound power $\sigma_s^2$.

Furthermore, the posteriori SNR is an SNR of an actual observation sound after noise superimposition, with respect to suppression target noise, and is calculated by obtaining power of an observation signal (targeted sound+noise) for each frame. The posteriori SNR is represented as follows.

$$\gamma(\lambda, k) = \frac{R^2(\lambda, k)}{\sigma_N^2(\lambda, k)} \qquad \text{[Math. 4]}$$

Here, reference numerals in the formula are as follows.

$\gamma(\lambda, k)$: posteriori SNR $R^2$: observation signal (targeted sound+noise) power Then, a gain function G ($\lambda$, k) for suppressing noise is calculated from the above-described priori SNR and posteriori SNR. The gain function G ($\lambda$, k) is as follows. Note that v and p are probability density distribution parameters of amplitude of voice.

$$G(\lambda, k) = u + \sqrt{u^2 + \frac{v(\lambda, k) - 1/2}{2\gamma(\lambda, k)}} \quad \text{[Math. 5]}$$

Here, "u" is represented as follows.

$$u = \frac{1}{2} - \frac{\mu}{4\sqrt{\gamma(\lambda, k)\xi(\lambda, k)}} \quad \text{[Math. 6]}$$

In Step S406 of FIG. 15, for example, a gain function is obtained as described above. This case is a case where it is determined in Step S404 that power of noise other than target noise at current frequency is equal to or smaller than a predetermined value. This case is a case where, for example, a sudden noise component or the like does not exist for a corresponding microphone 2 and frequency bin, and the accuracy of the above-described gain function (Math. 5) is estimated to be high.

Nevertheless, in a voice signal obtained by the microphone 2, actually, a time section in which only noise desired to be removed exists does not exist. In other words, dark noise, unsteady noise, or the like always exists, and an estimation error of a noise spectrum is generated.

Then, by erroneously determining a section including targeted sound or unsteady noise, as a noise section, an estimation error of a noise spectrum becomes larger.

Thus, noise reduction accuracy is enhanced by interpolating the calculation of a gain function in an unreliable band or microphone signal, using a directional characteristic of a noise source and a frequency characteristic thereof. The processing corresponds to the processing in Step S407 or S408.

First of all, gain function interpolation on a frequency axis in Step S407 will be described.

Note that a microphone index=m is set for a calculation target microphone 2. Furthermore, k and k' denote frequency indices. Hereinafter, a microphone 2 with microphone index=m will be described as a "microphone m".

Hereinafter, the processing of [1][2][3] is executed for each microphone m for which noise reduction is performed (azimuth angle $\theta$, elevation angle $\varphi$, distance l between a noise source and the microphone 2).

[1] Noise power $\sigma_N^2$ is estimated in a time section determined not to include targeted sound.

[2] A band k unlikely to include another noise (or targeted sound) is obtained. The band k is a band unlikely to include a component of another noise or targeted sound.

Using the above-described estimated noise power $\sigma_N^2$, the priori SNR, the posteriori SNR, and the gain function Gm (k) are calculated on the basis of each noise reduction method.

[3] A band k' highly likely to include another noise (or targeted sound) is obtained.

The noise dictionary data D (k', $\theta$, $\varphi$, l) is acquired, and estimated noise power $\sigma_N^2$ is obtained from a marginal band.

When noise power of the microphone m in the time frame A at the frequency band k is described as $\sigma_{N,M}^2(\lambda, k)$, on the basis of estimated noise power $\sigma_{N,M}^2(\lambda, k')$ of a marginal band k' and the noise dictionary data D, the noise power can be represented as follows.

$$\sigma_{N,M}^2(\lambda, k') = \frac{D(k', \theta, \phi, l)}{D(k, \theta, \phi, l)}\sigma_{N,M}^2(\lambda, k) \quad \text{[Math. 7]}$$

Then, the priori SNR, the posteriori SNR, and the gain function Gm (k) are calculated from obtained estimated noise power.

In this manner, a gain function can be calculated by interpolating, between frequencies, proportional calculation of a ratio of targeted sound with respect to observation sound (targeted sound+noise), or a rate of a noise component.

Note that it is desirable to perform update in such a manner as to achieve consistency between a band in which a gain function has already been calculated, and a frequency characteristic of noise, without independently updating a gain function for each frequency k.

Furthermore, in the band k' in which reliability of an estimated noise spectrum is low, it is considered that the estimated noise spectrum is not used, and an estimated noise spectrum is calculated from a gain function of a band with high reliability, using a noise directional characteristic dictionary.

Note that linear mixture that uses an appropriate time constant with estimated noise power in a past time frame, or the like may be used.

The gain function interpolation in the space direction in Step S408 is performed as follows.

In a case where there is a microphone m' (azimuth angle $\theta'$, elevation angle $\varphi'$, distance l') for which the update of a gain function has already ended, using the result, estimated noise power $\sigma_{N,M}^2$ is calculated and the gain function Gm(k) is calculated.

The estimated noise power $\sigma_{N,M}^2(\lambda, k)$ of the microphone m and the estimated noise power $\sigma_{N,M'}^2(\lambda, k)$ of the microphone m' are represented as follows.

$$\sigma_{N,M}^2(\lambda, k) = \frac{D(k, \theta, \phi, l)}{D(k, \theta', \phi', l')}\sigma_{N,M'}^2(\lambda, k) \quad \text{[Math. 8]}$$

In other words, in the interpolation in the space direction that uses another microphone m', a gain function is obtained by performing, between microphones, proportional calculation of a ratio of targeted sound with respect to observation sound (targeted sound+noise), or a rate of a noise component.

Note that linear mixture with a gain function calculated from an estimated noise spectrum of an actual microphone m may be used.

By performing these interpolations, performance and efficiency of noise reduction can be made higher.

In other words, it is possible to reduce a bad effect caused by an estimation error of a noise spectrum that practically provides cause of performance deterioration. This is because it is possible to accurately estimate another noise power from noise power of a band including a small amount of targeted sound and another noise, using directional characteristic information of a noise source.

Furthermore, it is possible to quickly calculate a gain function of another microphone 2 from a gain function to be applied to an observation signal of a microphone 2 existing in a certain orientation and at a certain distance.

Furthermore, it is possible to make consistency of gain functions between microphones 2. For example, even if there is a microphone 2 in which sudden noise such as contact is mixed, it is possible to accurately calculate noise power and a gain function from estimated noise power and a noise directionality dictionary of another microphone 2.

Note that the processing in FIG. 15 illustrates an example of separately performing interpolation in the frequency direction and interpolation in the space direction, but in addition to this or in place of this, it is considered to perform interpolation in the frequency direction and the space direction.

Subsequently, a case where a transfer function is considered will be described.

In a case where a transfer function between noise and a sound reception point is considered, the following processing of [1] [2] [3] [4] is performed.

[1] A transfer characteristic H (k, θ, φ, l) from a noise source to a sound reception point is acquired.

[2] At the time of calculation of a gain function, convolution of a transfer characteristic is performed into a dictionary. When a dictionary that considers a transfer function is denoted by Di '(k, θ, φ, l), Di' (k, θ, φ, l)=Di (k, θ, φ, l)*|H(k, θ, φ, l)| is obtained. Di (k, θ, φ, l) is noise dictionary data, and H (k, θ, φ, l) is a transfer function.

[3] A gain function is calculated on the basis of a method of each noise reduction. In this case, estimated noise power is updated using not the noise dictionary data Di but the noise dictionary data Di' for which the above-described convolution of the transfer characteristic has been performed, and a gain function is calculated using the noise dictionary data Di'.

[4] A gain function is applied, and a noise-reduced output is obtained.

As described above, a voice signal output X(k) having been subjected to noise reduction processing is represented as X(k)=G(k)Y(k). A gain function G(k) in this case is calculated from the noise dictionary data Di' (k, θ, φ, l).

Note that, as a transfer function, a transfer function H (ω, θ, l) obtained by simplifying a transfer function from a noise source to a sound reception point (the microphone 2) by distance is considered to be used, or a transfer function H (x1, y1, z1, x2, y2, z2) designating the positions of a noise source and a sound reception point by a coordinate is considered to be used.

In other words, the transfer function H is represented by a function that uses positions (three-dimensional coordinates) of a noise source and a sound reception point in a certain space, as arguments.

Furthermore, by appropriately discretizing the coordinates, the transfer function H may be recorded as data.

Furthermore, the transfer function H may be recorded as a function or data simplified by a distance between two points.

7. Conclusion and Modified Example

According to the above-described embodiments, the following effects are obtained.

The voice signal processing apparatus 1 of an embodiment includes the control calculation unit 5 that acquires the noise dictionary data D read out from the noise database unit 62 on the basis of installation environment information including information regarding a type of noise and orientation between a sound reception point (position of the microphone 2 in the case of the embodiment) and a noise source, and the NR unit 3 (noise suppression unit) that performs noise suppression processing on a voice signal obtained by the microphone 2 arranged at the sound reception point, using the noise dictionary data D.

By using noise dictionary data suitable for at least information regarding the type i of noise and the orientation (θ or φ) between the sound reception point at which the microphone 2 is arranged, and the noise source, the NR unit 3 can efficiently perform noise suppression on a voice signal from the microphone 2. This is because various sound sources each have a unique radiation characteristic, voice is not radiated uniformly in all the orientations, and in this point, performance of noise suppression can be enhanced by considering a radiation characteristic suitable for the type i of noise and the orientation (θ or φ).

For example, in a case where an acoustic device for telepresence, a television, or the like is permanently installed and operated in an actual space, a distance and an orientation from a noise source and a sound reception point (for example, the microphone 2) are often fixed. For example, a television is hardly moved after once being installed, and the position of a microphone mounted on a television with respect to an air conditioner or the like is given as a specific example. Furthermore, a case where voice of a human sitting on a table or the like is desired to be removed from recorded voice is also included in a position fixable case. Especially in these cases, it becomes possible to enhance quality of recorded sound by performing suppression of a noise source effectively utilizing orientation information, and further utilizing a spacial transfer characteristic between two points in an installation space.

On the other hand, in a case where a movably-installed device such as a smart speaker is installed, in a case where an installation location varies in the same installation environment, it is necessary to re-estimate the orientation and the distance of a noise source, and a configuration of performing optimum noise suppression using a combination of sound source type/orientation information and a preliminarily-obtained spacial transfer characteristic between two points is also considered.

At this time, in a case where an installation environment remains unchanged, it is also possible to accurately perform dynamic orientation/distance estimation utilizing preliminarily-obtained 3D shape dimension data of the installation environment, and orientation/distance information of a stationary sound source.

Note that, in the case of absolute directional noise, it is also possible to perform noise suppression by beam forming using a plurality of microphones, but a sufficient effect sometimes fails to be obtained depending on a reverberation characteristic of the environment. Furthermore, a targeted sound source is sometimes deteriorated depending on the noise orientation and the targeted sound orientation. It is therefore effective to combine with the technology of the present embodiment.

In the second embodiment, the description has been given of an example in which the control calculation unit 5 acquires a transfer function between a noise source and a sound reception point on the basis of installation environment information from the transfer function database unit 63 that holds transfer functions between two points under various environments, and the NR unit 3 uses the transfer function for noise suppression processing.

The performance of noise suppression can be enhanced by considering a radiation characteristic suitable for the type i of noise and the orientation (θ or φ), and a spacial transfer characteristic (transfer function H) indicating a characteristic of reverberation reflection in the space.

In the embodiment, the description has been given of an example in which the installation environment information includes information regarding the distance l from a sound reception point to a noise source, and the control calculation unit 5 acquires the noise dictionary data D from the noise database unit 62 while including the type i, the orientation (θ or φ), and the distance l as arguments.

The installation environment information includes the type i of noise, and the orientation (θ or φ) and the distance l from a sound reception point to a noise source, and noise dictionary data suitable for at least the type i, the orientation (θ or φ), and the distance l is stored in the noise database unit 62. Noise dictionary data suitable for the type i, the orientation (θ or φ), and the distance l can be thereby identified.

Then, by also reflecting the distance l between the noise source and the sound reception point, decay in a noise level that is based on the distance l can also be reflected. This can further enhance the performance of noise suppression.

In the embodiment, the description has been given of an example in which installation environment information includes information regarding the azimuth angle θ and the elevation angle φ between a sound reception point and a noise source, as orientation, and the control calculation unit 5 acquires the noise dictionary data D from the noise database unit 62 while including the type i, the azimuth angle θ, and the elevation angle φ as arguments.

In other words, information regarding the orientation is not information regarding a direction when a positional relationship between a sound reception point and a noise source is two-dimensionally seen, but information regarding a three-dimensional direction including a positional relationship in an up-down direction (elevation angle).

The installation environment information includes the type i of noise, and the azimuth angle θ, the elevation angle φ, and the distance l from the sound reception point to the noise source, and noise dictionary data suitable for at least the type i, the azimuth angle θ, the elevation angle φ, and the distance 1 is stored in the noise database unit 62.

By reflecting the azimuth angle θ and the elevation angle φ as the orientation between the noise source and the sound reception point, it is possible to perform noise suppression considering a property of noise that is based on the more accurate orientation in a three-dimensional space, and enhance noise suppression performance.

Figure 14:
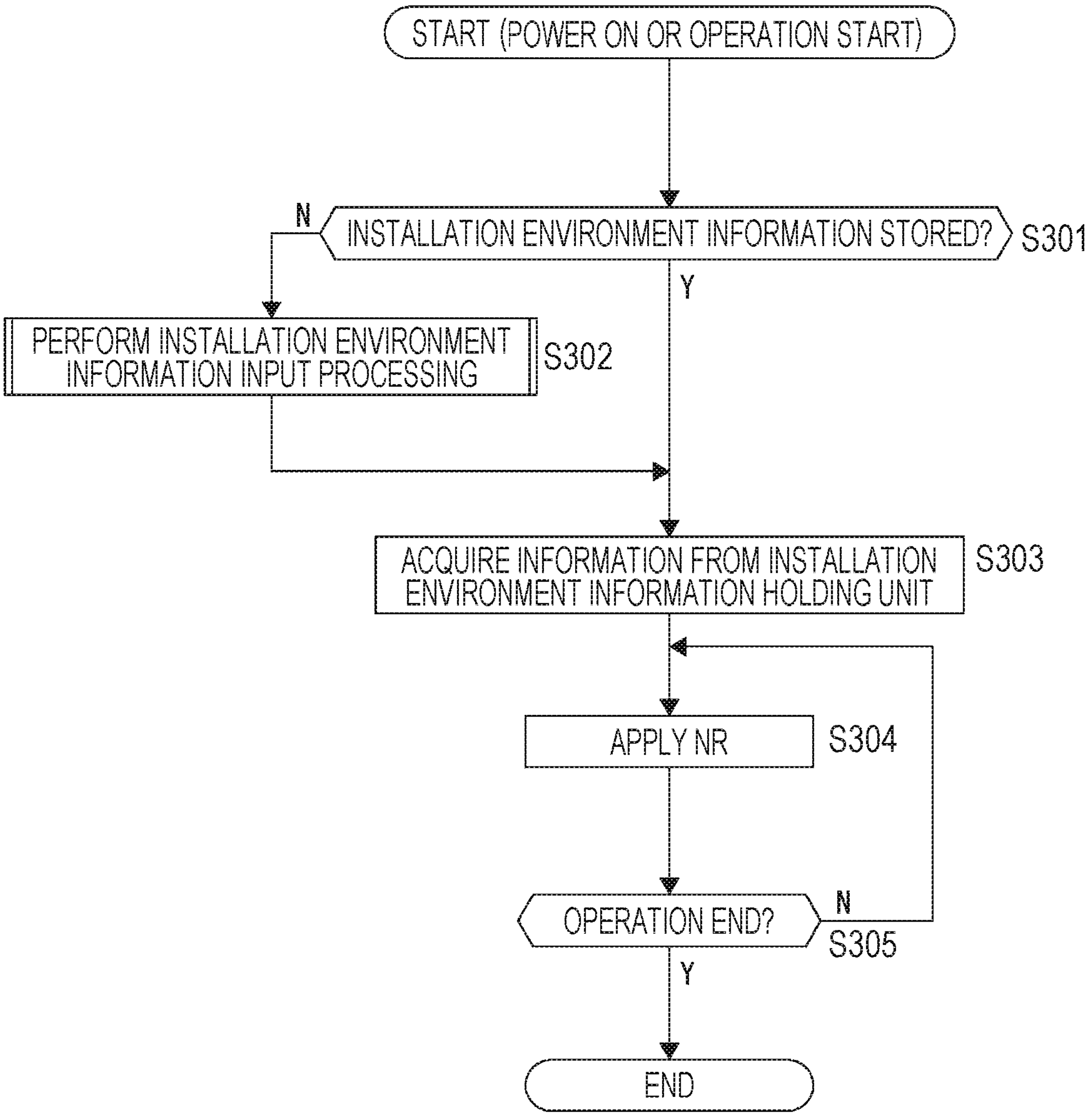
FIG. 14 is a flowchart of processing performed when a device is used according to an embodiment.

In the embodiment, the description has been given of an example in which the installation environment information holding unit 61 storing installation environment information is included (refer to FIGS. 3B, 13, and 14).

For example, information preliminarily input as installation environment information is stored in accordance with the installation of a voice signal processing apparatus. By preliminarily acquiring installation environment information in accordance with an actual installation environment, it becomes possible to appropriately obtain noise dictionary data at the time of an actual operation of the NR unit 3.

In the first and second embodiments, the description has been given of an example in which the control calculation unit 5 performs processing of storing installation environment information input by a user operation (refer to FIG. 13).

In a case where the user preliminarily inputs installation environment information in accordance with an actual installation environment, using the function of the installation environment information input unit 52, the control calculation unit 5 acquires the installation environment and stores the installation environment into the installation environment information holding unit 61. The noise dictionary data D suitable for an installation environment designated by the user at the time of an actual operation of the NR unit 3 can be thereby obtained from the noise database unit 62.

In the third and fourth embodiments, the description has been given of an example in which the control calculation unit 5 performs processing of estimating the orientation or the distance between a sound reception point and a noise source, and performs processing of storing installation environment information suitable for an estimation result.

The control calculation unit 5 preliminarily estimates the orientation or the distance between a noise source in accordance with an actual installation environment, using the function of the noise orientation/distance estimation unit 54, and stores an estimation result into the installation environment information holding unit 61 as installation environment information. The noise dictionary data D suitable for an installation environment can be thereby obtained from the noise database unit 62 at the time of an actual operation of the NR unit 3 even if the user does not input installation environment information.

Furthermore, when an installation position is moved, or the like, there is no need for the user to newly input installation environment information, and installation environment information can also be updated to new installation environment information on the basis of estimation of the orientation or distance.

In the fourth embodiment, the description has been given of an example in which, when estimating the orientation or distance between a sound reception point and a noise source, the control calculation unit 5 determines whether or not noise of the type of the noise source exists in a predetermined time section.

The orientation or distance between the noise source can be thereby adequately estimated.

In the fifth embodiment, the description has been given of an example in which the control calculation unit 5 performs processing of storing installation environment information determined on the basis of an image captured by an imaging apparatus.

For example, image capturing is performed by an imaging apparatus serving as the input device 7, in a state in which the voice signal processing apparatus 1 is installed in a usage environment. The control calculation unit 5 analyzes an image captured in an actual installation environment, and estimates the type, orientation, distance, and the like of a noise source, using the function of the shape/type estimation unit 55. By storing the estimation result into the installation environment information holding unit 61 as installation environment information, the noise dictionary data D suitable for an installation environment can be thereby obtained from the noise database unit 62 at the time of an actual operation of the NR unit 3 even if the user does not input installation environment information.

Furthermore, when an installation position is moved, or the like, there is no need for the user to newly input installation environment information, and installation environment information can also be updated to new installation environment information on the basis of analysis of a captured image.

In the fifth embodiment, the description has been given of an example in which the control calculation unit 5 performs shape estimation on the basis of a captured image. For example, image capturing is performed by an imaging apparatus in a state in which the voice signal processing apparatus 1 is installed in a usage environment, and a three-dimensional shape of an installation space is estimated.

Using the function of the shape/type estimation unit 55, the control calculation unit 5 can analyze an image captured in an actual installation environment, estimates a three-dimensional shape, and estimates the presence or absence and position of a noise source. The estimation result is stored into the installation environment information holding unit 61 as installation environment information. Installation environment information can be thereby automatically acquired. For example, a home electric appliance serving as a noise source can be determined, or a distance, an orientation, a reflection status of voice, and the like can be adequately recognized from a space shape.

The NR unit 3 of the embodiment calculates a gain function using the noise dictionary data D acquired from the noise database unit 62, and performs noise reduction processing (noise suppression processing) using the gain function.

A gain function suitable for environment information can be thereby obtained, and noise suppression processing adapted to an environment is executed.

Furthermore, the description has been given of an example in which the NR unit 3 of the embodiment calculates a gain function on the basis of the noise dictionary data D' that reflects the transfer function H obtained by convoluting a transfer function between a noise source and a sound reception point, into the noise dictionary data D acquired from the noise database unit 62, and performs noise suppression processing using the gain function.

In other words, in a case where the transfer function H is reflected, the noise dictionary data D is deformed. A gain function that considers a transfer function between a noise source and a sound reception point can thereby be obtained, and noise suppression performance can be enhanced.

As described above with reference to FIG. 15, the description has been given of an example in which, in the noise reduction processing, the NR unit 3 of the embodiment performs gain function interpolation in the frequency direction (Step S407) in accordance with predetermined condition determination (Step S404 or S405), and performs noise suppression processing (Step S409) using the interpolated gain function.

For example, in a case where power of noise other than removal target noise is large due to sudden noise or the like in a certain frequency bin, it is assumed that a gain function for removing removal target noise in the frequency bin cannot be appropriately calculated. Thus, a status of a neighborhood frequency bin is determined, and if power of noise other than removal target noise is not large in the neighborhood frequency bin, interpolation is performed using a gain coefficient in the frequency bin. By using noise dictionary data in particular, it becomes possible to perform appropriate interpolation by simple calculation. The noise suppression performance is thereby enhanced, reduction in processing load is achieved, and processing speed advancement is accordingly achieved.

Furthermore, in the processing example in FIG. 15, the NR unit 3 performs gain function interpolation in the space direction (Step S408) in accordance with a predetermined condition determination (Step S404 or S405), and performs noise suppression processing (Step S409) using the interpolated gain function.

For example, a gain coefficient can be calculated by performing interpolation of a gain function in the space direction while reflecting a difference in azimuth angle θ between the microphones 2. By using noise dictionary data in particular, it becomes possible to perform appropriate interpolation by simple calculation. The noise suppression performance is thereby enhanced, reduction in processing load is achieved, and processing speed advancement is accordingly achieved.

Especially in a case where power of noise other than removal target noise is large in a frequency bin in which gain coefficient calculation is being performed or in a neighborhood frequency bin thereof, as described in the processing in FIG. 15, by applying gain function interpolation in the space direction, even when interpolation in the frequency direction is inappropriate, an appropriate gain function can be obtained.

The description has been given of an example in which the NR unit 3 of the embodiment performs noise suppression processing using an estimation result of a time section not including noise and a time section including noise (refer to FIG. 5).

For example, a priori SNR and a posteriori SNR are obtained in accordance with the estimation of the existence or non-existence of noise as a time section, and the priori SNR and the posteriori SNR are reflected in gain function calculation.

Therefore, noise power can be appropriately estimated, and appropriate gain function calculation can be performed.

The description has been given of an example in which the control calculation unit 5 of the embodiment acquires noise dictionary data from a noise database unit for each frequency band.

In other words, as described above with reference to FIG. 15, noise dictionary data suitable for installation environment information (all of part of type i, azimuth angle θ, elevation angle φ, distance l) is acquired for each frequency bin, and a gain function is obtained. It therefore becomes possible to perform noise suppression processing using an appropriate gain function for each frequency bin.

In the embodiment, the description has been given of an example in which the storage unit 6 storing the transfer function database unit 63 is included (refer to FIG. 3B).

The voice signal processing apparatus 1 can thereby independently obtain the transfer function H appropriately at the time of an actual operation of the NR unit 3.

In the embodiment, the description has been given of an example in which the storage unit 6 storing the noise database unit 62 is included (refer to FIG. 3B).

The voice signal processing apparatus can thereby independently obtain the noise dictionary data D appropriately at the time of an actual operation of the NR unit 3.

As the embodiment, a configuration in which the control calculation unit 5 acquires the noise dictionary data D by communication with an external device has been exemplified as in FIG. 2.

In other words, the noise database unit 62 is not stored into a voice signal processing apparatus but stored into a cloud or the like, for example, and the noise dictionary data D is acquired by communication.

This can reduce a storage capacity burden on the voice signal processing apparatus 1. In particular, a data amount of the noise database unit 62 sometimes becomes enormous, and in this case, handling becomes easier by using an external resource like the storage unit 6A in FIG. 2. Furthermore, as a data amount of the noise dictionary data D becomes satisfactory, noise dictionary data suitable for various environments is stored. That is, by storing the noise database unit 62 in an external resource and each voice signal processing apparatus 1 acquiring the noise dictionary data D by communication, it becomes possible to acquire the noise dictionary data D more suitable for an environment of each voice signal processing apparatus 1. This can further enhance noise suppression performance.

Note that storing the transfer function database unit 63 in an external resource like the storage unit 6A is also preferable for similar reasons.

Moreover, an external resource like the storage unit 6A can also be caused to have a function of the installation environment information holding unit 61 in accordance with each voice signal processing apparatus 1, and hardware burden on the voice signal processing apparatus 1 can be thereby reduced.

Note that effects described in this specification are mere exemplifications and are not limited, and other effects may be caused.

Note that the present technology can also employ the following configurations.

(1) A voice signal processing apparatus including:

a control calculation unit configured to acquire noise dictionary data read out from a noise database unit on the basis of installation environment information including information regarding a type of noise and an orientation between a sound reception point and a noise source; and a noise suppression unit configured to perform noise suppression processing on a voice signal obtained by a microphone arranged at the sound reception point, using the noise dictionary data.

(2) The voice signal processing apparatus according to (1) described above, in which the control calculation unit acquires a transfer function between a noise source and the sound reception point on the basis of the installation environment information from a transfer function database unit that holds a transfer function between two points under various environments, and the noise suppression unit uses the transfer function for noise suppression processing.

(3) The voice signal processing apparatus according to (1) or (2) described above, in which the installation environment information includes information regarding a distance from the sound reception point to a noise source, and the control calculation unit acquires noise dictionary data from the noise database unit while including the type, the orientation, and the distance as arguments.

(4) The voice signal processing apparatus according to any of (1) to (3) described above, in which the installation environment information includes information regarding an azimuth angle and an elevation angle between the sound reception point and a noise source as the orientation, and the control calculation unit acquires noise dictionary data from the noise database unit while including the type, the azimuth angle, and the elevation angle as arguments.

(5) The voice signal processing apparatus according to any of (1) to (4) described above, further including an installation environment information holding unit configured to store the installation environment information.

(6) The voice signal processing apparatus according to any of (1) to (5) described above, in which the control calculation unit performs processing of storing installation environment information input by a user operation.

(7) The voice signal processing apparatus according to any of (1) to (6) described above, in which the control calculation unit performs processing of estimating an orientation or a distance between the sound reception point and a noise source, and performs processing of storing installation environment information suitable for an estimation result.

(8) The voice signal processing apparatus according to (7) described above, in which, when estimating an orientation or a distance between the sound reception point and a noise source, the control calculation unit determines whether or not noise of a type of the noise source exists in a predetermined time section.

(9) The voice signal processing apparatus according to any of (1) to (8) described above, in which the control calculation unit performs processing of storing installation environment information determined on the basis of an image captured by an imaging apparatus.

(10) The voice signal processing apparatus according to (9) described above, in which the control calculation unit performs shape estimation on the basis of a captured image.

(11) The voice signal processing apparatus according to any of (1) to (10) described above, in which the noise suppression unit calculates a gain function using noise dictionary data acquired from the noise database unit, and performs noise suppression processing using the gain function.

(12) The voice signal processing apparatus according to any of (1) to (11) described above, in which the noise suppression unit calculates a gain function on the basis of noise dictionary data that reflects a transfer function obtained by convoluting a transfer function between a noise source and the sound reception point, into noise dictionary data acquired from the noise database unit, and performs noise suppression processing using the gain function.

(13) The voice signal processing apparatus according to any of (1) to (12) described above, in which the noise suppression unit performs gain function interpolation in a frequency direction in accordance with predetermined condition determination in noise suppression processing, and performs noise suppression processing using an interpolated gain function.

(14) The voice signal processing apparatus according to any of (1) to (13) described above, in which the noise suppression unit performs gain function interpolation in a space direction in accordance with predetermined condition determination in noise suppression processing, and performs noise suppression processing using an interpolated gain function.

(15) The voice signal processing apparatus according to any of (1) to (14) described above, in which the noise suppression unit performs noise suppression processing using an estimation result of a time section not including noise and a time section including noise.

(16) The voice signal processing apparatus according to any of (1) to (15) described above, in which the control calculation unit acquires noise dictionary data from the noise database unit for each frequency band.

(17) The voice signal processing apparatus according to (2) described above, further including a storage unit configured to store the transfer function database unit.

(18) The voice signal processing apparatus according to any of (1) to (17) described above, further including a storage unit configured to store the noise database unit.

(19) The voice signal processing apparatus according to any of (1) to (17) described above, in which the control calculation unit acquires noise dictionary data by communication with an external device.

(20) A noise suppression method performed by a voice signal processing apparatus, the noise suppression method including:

acquiring noise dictionary data read out from a noise database unit on the basis of installation environment information including information regarding a type of noise and an orientation between a sound reception point and a noise source; and performing noise suppression processing on a voice signal obtained by a microphone arranged at the sound reception point, using the noise dictionary data.

REFERENCE SIGNS LIST

1 Voice signal processing apparatus
2 Microphone
3 NR unit
4 Signal processing unit
5, 5A Control calculation unit
6, 6A Storage unit
7 Input device
51 Management control unit
52 Installation environment information input unit
53 Noise section estimation unit
54 Noise orientation/distance estimation unit
55 Shape/type estimation unit
61 Installation environment information holding unit
62 Noise database unit
63 Transfer function database unit

The invention claimed is:

1. A voice signal processing apparatus, comprising:

a Central Processing Unit (CPU) configured to:

obtain an input voice signal via a microphone arranged at a sound reception point;

acquire installation environment information that includes information regarding a type of noise and an orientation between the sound reception point and a noise source;

acquire noise dictionary data from a noise database based on the installation environment information, wherein the noise dictionary data includes a directional characteristic of the noise source; and perform a noise suppression processing on the input voice signal based on the noise dictionary data to output a voice signal as a noise-reduced output.

2. The voice signal processing apparatus according to claim 1, wherein the CPU is further configured to acquire a transfer function between the noise source and the sound reception point on a basis of the installation environment information from a transfer function database; and use the transfer function for the noise suppression processing.

3. The voice signal processing apparatus according to claim 1, wherein the installation environment information further includes information regarding a distance from the sound reception point to the noise source, and the CPU is further configured to acquire the noise dictionary data from the noise database based on the type of noise, the orientation, and the distance as arguments for the noise database.

4. The voice signal processing apparatus according to claim 1, wherein the installation environment information further includes information regarding an azimuth angle and an elevation angle between the sound reception point and the noise source as the orientation, and the CPU is further configured to acquire the noise dictionary data from the noise database based on the type of noise, the azimuth angle, and the elevation angle as arguments for the noise database.

5. The voice signal processing apparatus according to claim 1, wherein the CPU is further configured to store the installation environment information.

6. The voice signal processing apparatus according to claim 1, wherein the CPU is further configured to store the installation environment information based on a user input.

7. The voice signal processing apparatus according to claim 1, wherein the CPU is further configured to:

perform processing of estimation of the orientation or a distance between the sound reception point and the noise source; and store the installation environment information suitable for an estimation result.

8. The voice signal processing apparatus according to claim 7, wherein, based on the orientation or the distance between the sound reception point and the noise source is estimated, the CPU is further configured to determine whether a noise of a type of the noise source exists in a predetermined time section.

9. The voice signal processing apparatus according to claim 1, wherein the CPU is further configured to store the installation environment information determined based on an image captured by an imaging apparatus.

10. The voice signal processing apparatus according to claim 9, wherein the CPU is further configured to perform a shape estimation based on the image.

11. The voice signal processing apparatus according to claim 1, wherein the CPU is further configured to calculate a gain function based on the noise dictionary data acquired from the noise database; and perform the noise suppression processing based on the gain function.

12. The voice signal processing apparatus according to claim 1, wherein the CPU is further configured to:

calculate a gain function based on the noise dictionary data that reflects a transfer function, wherein the transfer function is obtained by convoluting a transfer function between the noise source and the sound reception point into the noise dictionary data acquired from the noise database; and perform the noise suppression processing based on the gain function.

13. The voice signal processing apparatus according to claim 1, wherein the CPU is further configured to perform a gain function interpolation in a frequency direction in accordance with a predetermined condition determination in the noise suppression processing; and perform the noise suppression processing based on the gain function interpolation.

14. The voice signal processing apparatus according to claim 1, wherein the CPU is further configured to:

perform a gain function interpolation in a space direction in accordance with a predetermined condition determination in the noise suppression processing; and perform the noise suppression processing based on the gain function interpolation.

15. The voice signal processing apparatus according to claim 1, wherein the CPU is further configured to perform the noise suppression processing based on an estimation result of a time section not including a noise and a time section including the noise.

16. The voice signal processing apparatus according to claim 1, wherein the CPU is further configured to acquire the noise dictionary data from the noise database for each frequency band of the microphone.

17. The voice signal processing apparatus according to claim 2, wherein the CPU is further configured to store the transfer function database.

18. The voice signal processing apparatus according to claim 1, wherein the CPU is further configured to store the noise database.

19. The voice signal processing apparatus according to claim 1, wherein the CPU is further configured to acquire the noise dictionary data based on a communication with an external device.

20. A noise suppression method comprising:

in a voice signal processing apparatus that includes a Central Processing Unit (CPU):

obtaining, by the CPU, an input voice signal via a microphone arranged at a sound reception point;

acquiring installation environment information that includes information regarding a type of noise and an orientation between the sound reception point and a noise source;

acquiring, by the CPU, noise dictionary data read out from a noise database based on the installation environment information;

wherein the noise dictionary data includes a directional characteristic of the noise source; and performing a noise suppression processing on the input voice signal based on the noise dictionary data to output a voice signal as a noise-reduced output.

* * * * *